(12) United States Patent
Iwanowski et al.

(10) Patent No.: US 12,272,019 B1
(45) Date of Patent: Apr. 8, 2025

(54) SYNTHETIC SCENES

(71) Applicant: Apple Inc., Cupertino, CA (US)

(72) Inventors: Przemyslaw M. Iwanowski, San Francisco, CA (US); Joshua J. Taylor, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 136 days.

(21) Appl. No.: 18/185,888

(22) Filed: Mar. 17, 2023

Related U.S. Application Data

(60) Provisional application No. 63/362,278, filed on Mar. 31, 2022.

(51) Int. Cl.
| | |
|---|---|
| *G06T 19/20* | (2011.01) |
| *G06T 7/73* | (2017.01) |
| *G06T 17/20* | (2006.01) |
| *G06T 19/00* | (2011.01) |

(52) U.S. Cl.
CPC ............ *G06T 19/20* (2013.01); *G06T 7/75* (2017.01); *G06T 17/20* (2013.01); *G06T 19/006* (2013.01); *G06T 2219/2004* (2013.01)

(58) Field of Classification Search
CPC .......... G06T 19/20; G06T 7/75; G06T 17/20; G06T 19/006; G06T 2219/2004
See application file for complete search history.

(56) References Cited

U.S. PATENT DOCUMENTS

| | | | | |
|---|---|---|---|---|
| 11,112,886 | B2* | 9/2021 | Schmidt | ............ G02B 27/0176 |
| 2022/0035439 | A1* | 2/2022 | Holland | ................ G06F 3/0482 |

OTHER PUBLICATIONS

Introduction | MARS | 1.0.1, Manual, Available online at: <https://docs.unity3d.com/Packages/com.unity.mars@1.0/manual/index.html>, Accessed on Apr. 5, 2023, 2 pages.
Simulation Environments | MARS | 1.0.1, Manual, Available online at: <https://docs.unity3d.com/Packages/com.unity.mars@1.0/manual/SimulationEnvironments.html>, Accessed on Apr. 5, 2023, 4 pages.

* cited by examiner

*Primary Examiner* — Chong Wu
(74) *Attorney, Agent, or Firm* — Kubota & Basol LLP

(57) ABSTRACT

The creation of synthetic scenes from a combination of synthetic data and real environment data to allow for testing of extended reality (XR) applications on an electronic device is disclosed. In order to efficiently test an XR application, a scene data configuration can be specified within a synthetic service, representing a combination of different synthetic data and real environment data. In addition, scene understanding and alignment metadata can be added to the scene data. When the XR application is initiated, a synthetic scene in accordance with the scene data configuration and the added metadata can be rendered and presented on a display of the electronic device. The XR application can then be tested within the presented synthetic scene, with the application interacting with both the synthetic data and the real environment data of the synthetic scene as though it were interacting with real objects in a real environment.

25 Claims, 14 Drawing Sheets

SYNTHETIC SCENES

CROSS-REFERENCE TO RELATED APPLICATIONS

This application claims the benefit of U.S. Provisional Application No. 63/362,278, filed Mar. 31, 2022, the content of which is herein incorporated by reference in its entirety for all purposes.

FIELD

This relates generally to creating synthetic scenes by combining synthetic data and real environment data in extended reality (XR) environments.

BACKGROUND

Some computer graphical XR environments provide two-dimensional and/or three-dimensional environments where some of the objects presented for a user's viewing are representations of real-world objects (e.g., a table, a chair, a lamp, etc.) that have been scanned (e.g., captured using various sensors) using an electronic device (e.g., a smartphone, a tablet, a head-mounted display, etc.), and some of the objects are virtual and generated by software executing on a computer. Testing and debugging XR applications can be difficult, because XR applications may be designed to operate on a particular type of electronic device, and operate within XR environments generated from physical environments that are not readily accessible to developers and thus not available to be captured by sensors in the electronic device. In addition, XR applications may be designed to interact with objects in a particular way, but these objects may not be present in the physical environment, or the objects may be virtual, lacking the necessary attributes to enable the XR application to interact with the virtual object as though it were a real object. Even if the objects are present in the physical environment, they may not be captured in the XR environment with the attributes needed for meaningful testing and debugging of the XR application.

SUMMARY

Some examples of the disclosure are directed to creating synthetic scenes from a combination of synthetic data and real environment data, and presenting those synthetic scenes in an XR environment to allow application developers to test and debug XR applications on an electronic device. An XR application may request a particular mix of real and synthetic scene data from a synthetic service in order to render a synthetic scene and run the application. However, in order to efficiently test and debug the XR application, an application developer can specify a modified scene data configuration within the synthetic service, representing a combination of different types of synthetic data and real environment data. In addition, the application developer can add scene understanding and/or scene alignment metadata to the scene data for test purposes. When the XR application is initiated and scene data is requested, a synthetic scene in accordance with the modified scene data configuration and the added metadata can be retrieved from the synthetic service, where it can be rendered and presented on a display of the electronic device being used for the test (e.g., a smartphone, tablet, head-mounted display, and the like). The XR application can then be tested within the presented synthetic scene, with the application interacting with both the synthetic data and the real environment data of the synthetic scene as though it were interacting with real objects in the real environment.

In one illustrative example, a developer can specify a modified scene data configuration where synthetic data (e.g., a synthetic table) is added to the real environment, and the XR application can interact with the synthetic table as though it were a real table. In this example, the developer can advantageously test the XR application in a synthetic scene including the synthetic table even though a real table is not present in the real environment. In another illustrative example, the synthetic scene can include a synthetic table as a replacement for a real table in the real environment, and again the XR application can interact with the synthetic table as though it were a real table. In this example, a developer can advantageously test an XR application in a synthetic scene by trying out different synthetic tables having different attributes as a substitute for the real table.

In yet another illustrative example, a developer can specify a modified scene data configuration in which a synthetic environment (different from the actual real environment) can replace most of the real environment (except for orientation data, for example) to create a synthetic scene, while maintaining real environment data for simultaneous localization and mapping (SLAM) orientation purposes. In this example, the synthetic environment is presented on the display of the device, instead of the real environment available through a camera feed, even though the developer and the electronic device are present and may be moving around in a real environment that is different from the synthetic environment. The XR application can then interact with the synthetic environment as though it were the real environment. In this example, a developer can advantageously test an XR application in a desired synthetic scene, despite being present in an entirely different location. In a variation of this example, a synthetic environment (a synthetic version of a real environment that is different from the actual real environment that the developer is in) can replace most of the real environment (except for location, orientation or anchoring data, for example) to create a synthetic scene. In this example, the synthetic environment (replicating the real environment) is presented on the display of the device, even though the developer and the electronic device are present and may be moving around in a real environment that is identical or nearly identical to the synthetic environment. In a further variation of this example, the presentation of the synthetic environment is optional, and instead the real environment camera feed can be presented, with the underlying data and attributes of the synthetic environment (e.g., the planes, scene understanding mesh, etc.) being available to provide realistic interaction with an XR application. The XR application can then interact with the synthetic environment as though it were the real environment. In this example, a developer can advantageously test an XR application in a synthetic version of the real environment while making adjustments to (e.g., changing the attributes of) the synthetic version of the real environment.

The synthetic data can include synthetic real environment data (data previously captured and accumulated from sensors on the electronic device), synthetic authored environment data (software-generated/authored data that simulates (spoofs) the data obtained from the sensors (e.g., color and/or depth camera output data), and synthetic authored scene understanding data (software-generated data that simulates (spoofs) the outputs of scene understanding algorithms (e.g., planes and/or meshes representing the real environment, etc.)). The real environment data can be derived from the data received from the sensors on the electronic device in real time, and can include actual real environment scene data, actual real environment location data, actual real environment orientation data, and actual real environment anchoring data.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1A:
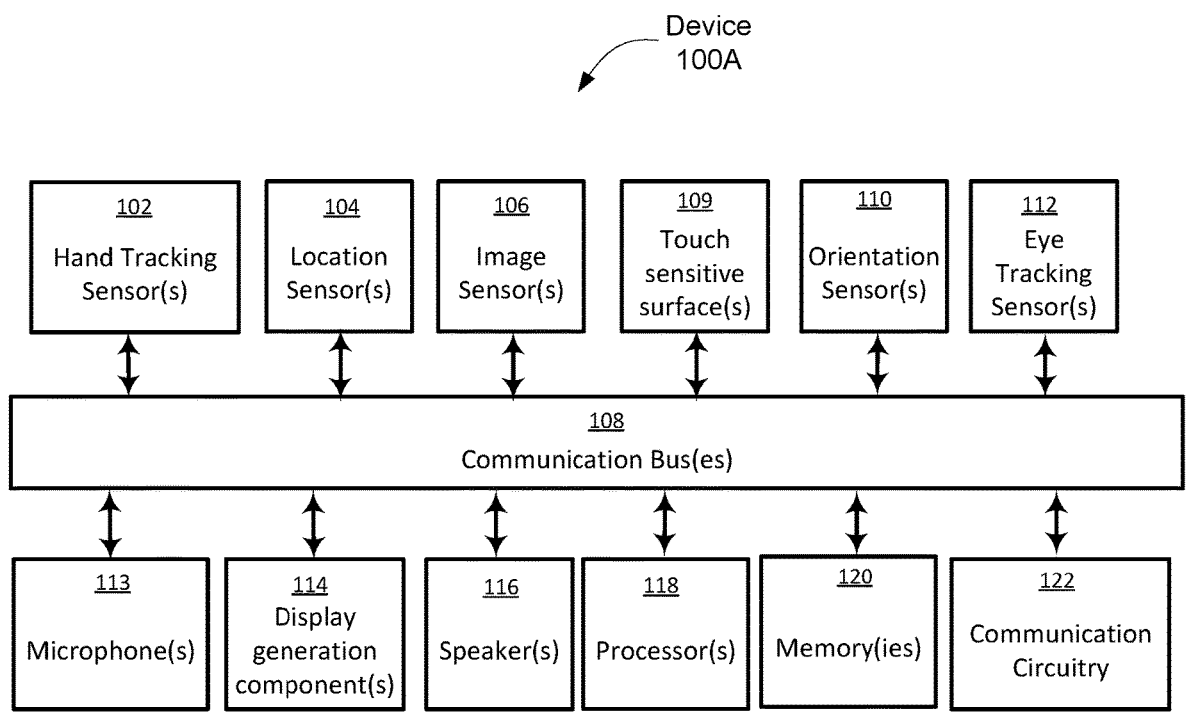
FIGS. 1A-1B illustrate example block diagrams of architectures for a device in accordance with some examples of the disclosure.

In the following description, reference is made to the accompanying drawings which form a part hereof, and in which it is shown by way of illustration specific examples that are optionally practiced. It is to be understood that other examples of the disclosure are optionally used and structural changes are optionally made without departing from the scope of the disclosure.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Further, although the following description uses terms "first," "second," etc. to describe various elements, these elements should not be limited by the terms. These terms are only used to distinguish one element from another. For example, a first device could be termed a second device, and, similarly, a second device could be termed a first device, without departing from the scope of the various described examples. The first device and the second device are both devices, but they are typically not the same device.

As described herein, the term "if", optionally, means "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. An XR environment is often referred to herein as a computer-generated environment. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable device may have one or more speaker(s) and an integrated opaque display. Alternatively, a head mountable device may be configured to accept an external opaque display (e.g., a smartphone). The head mountable device may incorporate one or more imaging sensors to capture images or video of the physical environment, and/or one or more microphones to capture audio of the physical environment. Rather than an opaque display, a head mountable device may have a transparent or translucent display. The transparent or translucent display may have a medium through which light representative of images is directed to a person's eyes. The display may utilize digital light projection, OLEDs, LEDs, μLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
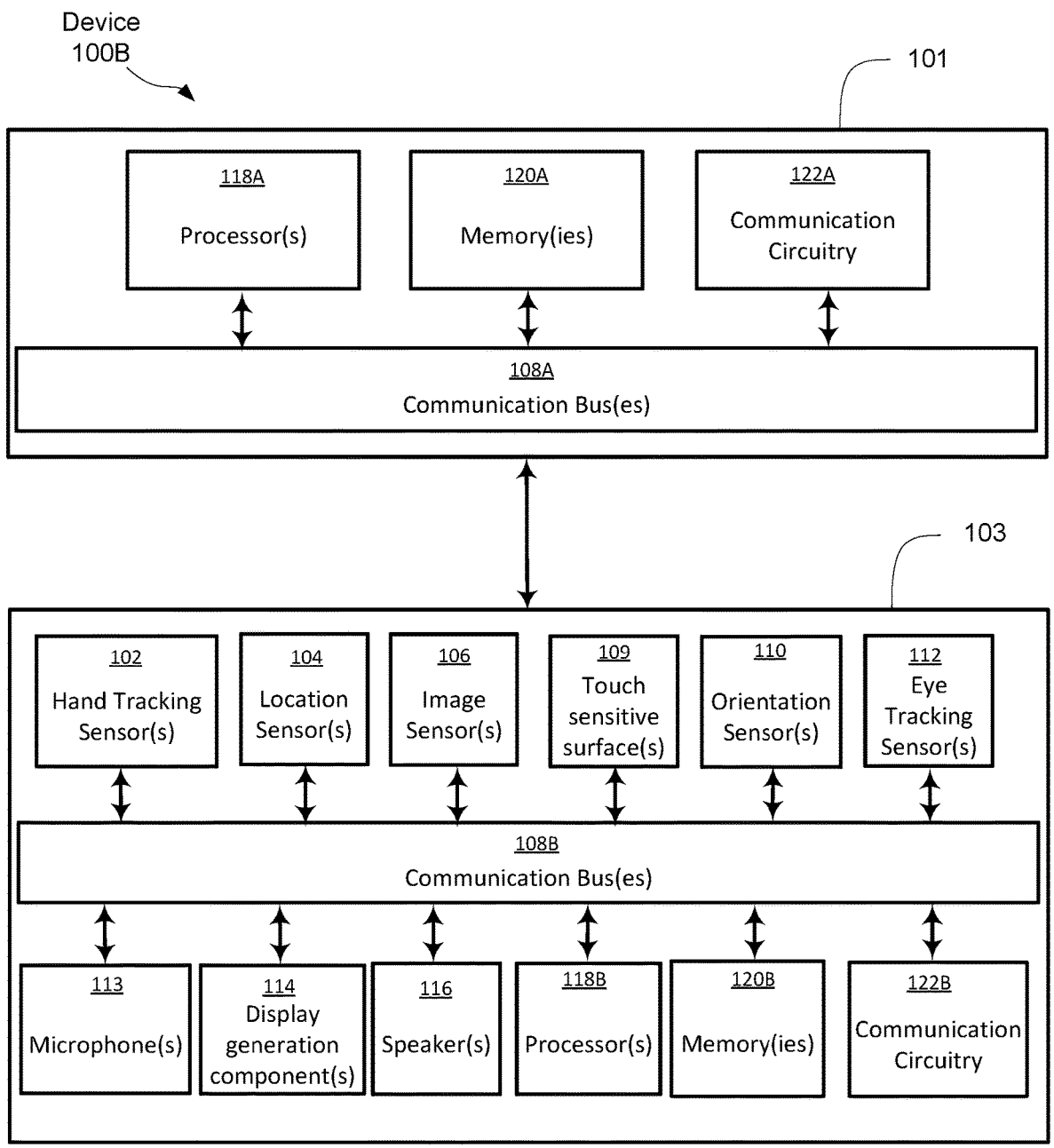

FIGS. 1A-1B illustrate example block diagrams of architectures for a device in accordance with some examples of the disclosure. As illustrated in FIG. 1A, device 100A optionally includes various sensors (e.g., one or more hand tracking sensor(s) 102, one or more location sensor(s) 104, one or more image sensor(s) 106, one or more touch-sensitive surface(s) 109, one or more motion and/or orientation sensor(s) 110, one or more eye tracking sensor(s) 112, one or more microphone(s) 113 or other audio sensors, etc.), one or more display generation component(s) 114, one or more speaker(s) 116, one or more processor(s) 118, one or more memories 120, and/or communication circuitry 122. One or more communication buses 108 are optionally used for communication between the above mentioned components of device 100A. In some examples, device 100A is a portable device, such as a mobile phone, smart phone, a tablet computer, a laptop computer, an auxiliary device in communication with another device, etc.

Communication circuitry 122 optionally includes circuitry for communicating with electronic devices, networks, such as the Internet, intranets, a wired network and/or a wireless network, cellular networks and wireless local area networks (LANs). Communication circuitry 122 optionally includes circuitry for communicating using near-field communication (NFC) and/or short-range communication, such as Bluetooth®.

Processor(s) 118 optionally include one or more general purpose processors, one or more graphics processors, and/or one or more digital signal processors (DSPs). In some examples, memory 120 is a non-transitory computer-readable storage medium (e.g., flash memory, random access memory, or other volatile or non-volatile memory or storage) that stores computer-readable instructions and/or programs configured to be executed by processor(s) 118 to perform the techniques, processes, and/or methods described below. In some examples, memories 120 include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

Display generation component(s) 114 optionally include a single display (e.g., a liquid-crystal display (LCD), organic light-emitting diode (OLED), or other types of display). In some examples, display generation component(s) 114 include multiple displays. In some examples, display generation component(s) 114 includes a display with a touch-sensitive surface (e.g., a touch screen), a projector, a holographic projector, a retinal projector, etc.

In some examples, device 100A includes touch-sensitive surface(s) 109 configured to receive user inputs (touch and/or proximity inputs), such as tap inputs and swipe inputs or other gestures. In some examples, display generation component(s) 114 and touch-sensitive surface(s) 109 together form touch-sensitive display(s) (e.g., a touch screen integrated with device 100A or external to device 100A that is in communication with device 100A).

Image sensors(s) 106 optionally include one or more visible light image sensor, such as charged coupled device (CCD) sensors, and/or complementary metal-oxide-semiconductor (CMOS) sensors operable to obtain images of physical objects from the real-world environment. Image sensor(s) 106 optionally include one or more infrared (IR) or near infrared (NIR) sensors, such as a passive or an active IR or NIR sensor, for detecting infrared or near infrared light from the real-world environment. For example, an active IR sensor includes an IR emitter for emitting infrared light into the real-world environment. Image sensor(s) 106 optionally include one or more cameras configured to capture movement of physical objects in the real-world environment. Image sensor(s) 106 optionally include one or more depth sensors configured to detect the distance of physical objects from device 100A. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, device 100A uses CCD sensors, event cameras, and depth sensors in combination to detect the physical environment around device 100A. In some examples, image sensor(s) 106 include a first image sensor and a second image sensor. The first image sensor and the second image sensor work together and are optionally configured to capture different information of physical objects in the real-world environment. In some examples, the first image sensor is a visible light image sensor and the second image sensor is a depth sensor. In some examples, device 100A uses image sensor(s) 106 to detect the position and orientation of device 100A and/or display generation component(s) 114 in the real-world environment. For example, device 100A uses image sensor(s) 106 to track the position and orientation of display generation component(s) 114 relative to one or more fixed objects in the real-world environment.

In some examples, device 100A optionally includes hand tracking sensor(s) 102 and/or eye tracking sensor(s) 112. Hand tracking sensor(s) 102 are configured to track the position/location of a user's hands and/or fingers, and/or motions of the user's hands and/or fingers with respect to the computer-generated environment, relative to the display generation component(s) 114, and/or relative to another coordinate system. Eye tracking sensor(s) 112 are configured to track the position and movement of a user's gaze (eyes, face, and/or head, more generally) with respect to the real-world or computer-generated environment and/or relative to the display generation component(s) 114. In some examples, hand tracking sensor(s) 102 and/or eye tracking sensor(s) 112 are implemented together with the display generation component(s) 114 (e.g., in the same device). In some examples, the hand tracking sensor(s) 102 and/or eye tracking sensor(s) 112 are implemented separate from the display generation component(s) 114 (e.g., in a different device).

In some examples, the hand tracking sensor(s) 102 uses image sensor(s) 106 (e.g., one or more IR cameras, 3D cameras, depth cameras, etc.) that capture three-dimensional information from the real-world including one or more hands. In some examples, the hands can be resolved with sufficient resolution to distinguish fingers and their respective positions. In some examples, one or more image sensor(s) 106 are positioned relative to the user to define a field of view of the image sensor(s) and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures) can be advantageous in that it provides an input means that does not require the user to touch or hold input device, and using image sensors allows for tracking without requiring the user to wear a beacon or sensor, etc. on the hands/fingers.

In some examples, eye tracking sensor(s) 112 includes one or more eye tracking cameras (e.g., IR cameras) and/or illumination sources (e.g., IR light sources/LEDs) that emit light towards a user's eyes. Eye tracking cameras may be pointed towards a user's eyes to receive reflected light from the light sources directly or indirectly from the eyes. In some examples, both eyes are tracked separately by respective eye tracking cameras and illumination sources, and a gaze can be determined from tracking both eyes. In some examples, one eye (e.g., a dominant eye) is tracked by a respective eye tracking camera/illumination source(s).

Device 100A optionally includes microphones(s) 113 or other audio sensors. Device 100A uses microphone(s) 113 to detect sound from the user and/or the real-world environment of the user. In some examples, microphone(s) 113 includes an array of microphones that optionally operate together (e.g., to identify ambient noise or to locate the source of sound in space of the real-world environment).

Device 100A optionally includes location sensor(s) 104 configured to detect a location of device 100A and/or of display generation component(s) 114. For example, location sensor(s) 104 optionally includes a GPS receiver that receives data from one or more satellites and allows device 100 to determine the device's absolute position in the physical world.

Device 100A optionally includes motion and/or orientation sensor(s) 110 configured to detect orientation and/or movement of device 100A and/or display generation component(s) 114. For example, device 100A uses orientation sensor(s) 110 to track changes in the position and/or orientation of device 100A and/or display generation component(s) 114 (e.g., with respect to physical objects in the real-world environment). Orientation sensor(s) 110 optionally include one or more gyroscopes, one or more accelerometers, and/or one or more inertial measurement units (IMUs).

It is understood that the architecture of FIG. 1A is an example architecture, but that device 100A is not limited to the components and configuration of FIG. 1A. For example, the device/system can include fewer, additional, or other components in the same or different configurations. In some examples, as illustrated in FIG. 1B, device 100B can be divided between multiple devices. For example, a first device 101 optionally includes processor(s) 118A, memory or memories 120A, and communication circuitry 122A, optionally communicating over communication bus(es) 108A. A second device 103 (e.g., corresponding to device 100B) optionally includes various sensors (e.g., one or more hand tracking sensor(s) 102, one or more location sensor(s) 104, one or more image sensor(s) 106, one or more touch-sensitive surface(s) 109, one or more motion and/or orientation sensor(s) 110, one or more eye tracking sensor(s) 112, one or more microphone(s) 113 or other audio sensors, etc.), one or more display generation component(s) 114, one or more speaker(s) 116, one or more processor(s) 118B, one or more memories 120B, and/or communication circuitry 122B. One or more communication buses 108B are optionally used for communication between the above-mentioned components of device 103. The details of the components for devices 101 and 103 are similar to the corresponding components discussed above with respect to device 100B and are not repeated here for brevity. First device 101 and second device 103 optionally communicate via a wired or wireless connection (e.g., via communication circuitry 122A-122B) between the two devices.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

In the discussion that follows, synthetic data, as defined herein, is object or environment data that includes additional information such as mesh reconstruction data and material metadata and allows client applications to interact with the object or environment as though it were a real object or the real environment. In contrast, virtual data does not contain this additional information, and may include more limited information and geometries for visual purposes only. In addition, a service, as defined herein, is inclusive of, but not limited to, programs, applications, software tools, processes, engines, daemons, and other software that can perform automated tasks, respond to hardware events, receive user input, and listen for data requests from other software applications.

Some examples of the disclosure are directed to creating synthetic scenes from a combination of synthetic data and real environment data, and presenting those synthetic scenes in an XR environment to allow application developers to test and debug XR applications on an electronic device. An XR application may request a particular mix of real and synthetic scene data from a synthetic service in order to render a synthetic scene and run the application. However, in order to efficiently test and debug the XR application, an application developer can specify a modified scene data configuration within the synthetic service, representing a combination of different types of synthetic data and real environment data. In addition, the application developer can add scene understanding and/or scene alignment metadata to the scene data for test purposes. When the XR application is initiated and scene data is requested, a synthetic scene in accordance with the modified scene data configuration and the added metadata can be retrieved from the synthetic service, where it can be rendered and presented on a display of the electronic device being used for the test (e.g., a smartphone, tablet, head-mounted display, and the like). The XR application can then be tested within the presented synthetic scene, with the application interacting with both the synthetic data and the real environment data of the synthetic scene as though it were interacting with real objects in the real environment.

In one illustrative example, a developer can specify a modified scene data configuration where synthetic data (e.g., a synthetic table) is added to the real environment, and the XR application can interact with the synthetic table as though it were a real table. In this example, the developer can advantageously test the XR application in a synthetic scene including the synthetic table even though a real table is not present in the real environment. In another illustrative example, the synthetic scene can include a synthetic table as a replacement for a real table in the real environment, and again the XR application can interact with the synthetic table as though it were a real table. In this example, a developer can advantageously test an XR application in a synthetic scene by trying out different synthetic tables having different attributes as a substitute for the real table.

In yet another illustrative example, a developer can specify a modified scene data configuration in which a synthetic environment (different from the actual real environment) can replace most of the real environment (except for orientation data, for example) to create a synthetic scene, while maintaining real environment data for SLAM orientation purposes. In this example, the synthetic environment is presented on the display of the device, instead of the real environment available through a camera feed, even though the developer and the electronic device are present and may be moving around in a real environment that is different from the synthetic environment. The XR application can then interact with the synthetic environment as though it were the real environment. In this example, a developer can advantageously test an XR application in a desired synthetic scene, despite being present in an entirely different location. In a variation of this example, a synthetic environment (a synthetic version of a real environment that is different from the actual real environment that the developer is in) can replace most of the real environment (except for location, orientation or anchoring data, for example) to create a synthetic scene. In this example, the synthetic environment (replicating the real environment) is presented on the display of the device, even though the developer and the electronic device are present and may be moving around in a real environment that is identical or nearly identical to the synthetic environment. In a further variation of this example, the presentation of the synthetic environment is optional, and instead the real environment camera feed can be presented, with the underlying data and attributes of the synthetic environment (e.g., the planes, scene understanding mesh, etc.) being available to provide realistic interaction with an XR application. The XR application can then interact with the synthetic environment as though it were the real environment. In this example, a developer can advantageously test an XR application in a synthetic version of the real environment while making adjustments to (e.g., changing the attributes of) the synthetic version of the real environment.

The synthetic data can include synthetic real environment data (data previously captured and accumulated from sensors on the electronic device), synthetic authored environment data (software-generated/authored data that simulates (spoofs) the data obtained from the sensors) (e.g., color and/or depth camera output data), and synthetic authored scene understanding data (software-generated data that simulates (spoofs) the outputs of scene understanding algorithms (e.g., planes and/or meshes representing the real environment, etc.)). The real environment data can be derived from the data received from the sensors on the electronic device in real time, and can include actual real environment scene data, actual real environment location data, actual real environment orientation data, and actual real environment anchoring data.

Figure 2:
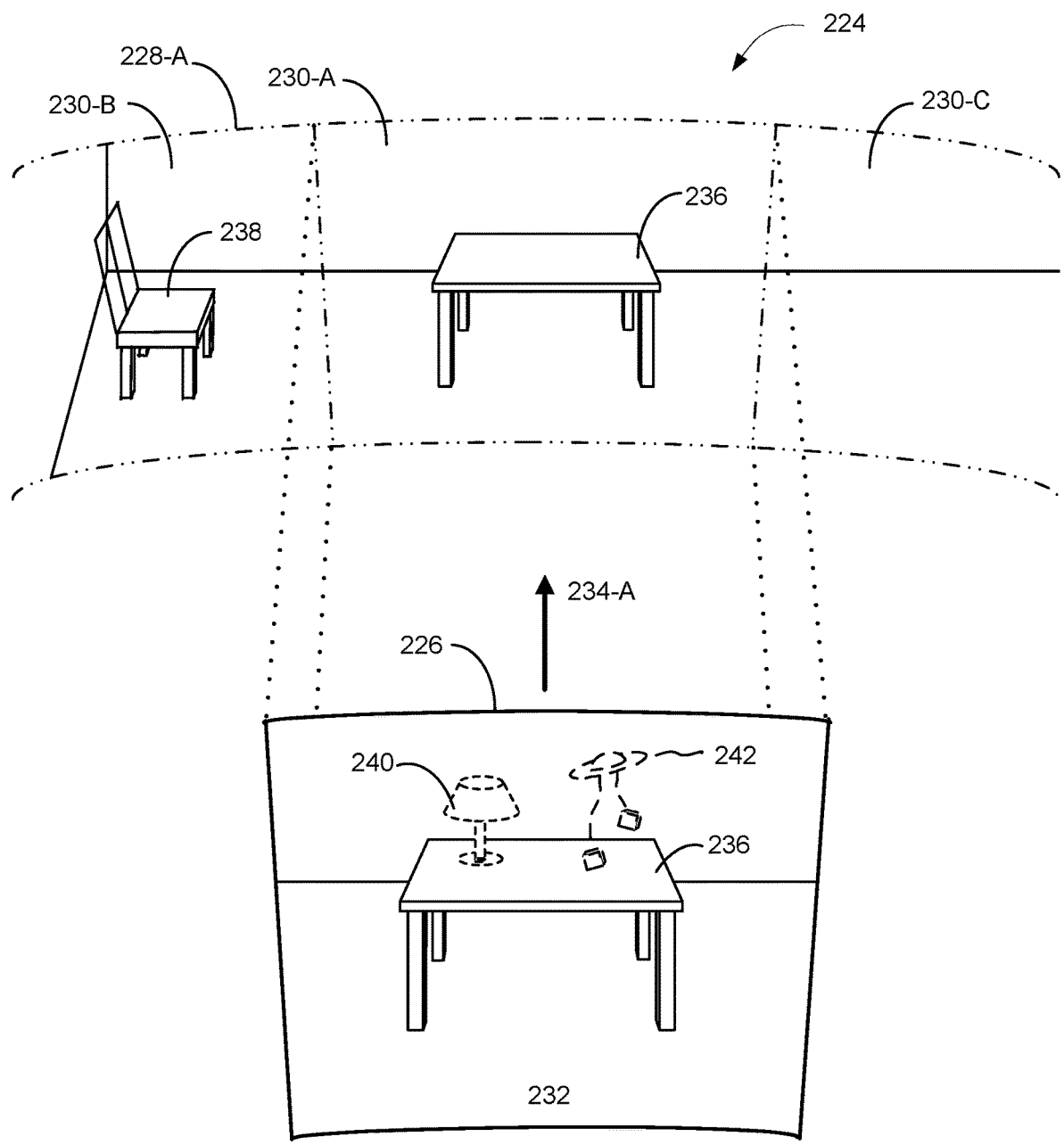
FIG. 2 illustrates an example of an XR application being tested in a synthetic scene being presented on a display of an electronic device in accordance with some examples of the disclosure.

FIG. 2 illustrates an example of an XR application (indicated symbolically at 242) being tested in synthetic scene 232 being presented on display 226 of an electronic device (e.g., device 100A or 100B of FIGS. 1A-1B) in accordance with some examples of the disclosure. Synthetic scene 232 includes a combination of synthetic data and real environment data (e.g., synthetic object 240 combined with real object 236 in a viewable portion 230-A of a real environment). In the example of FIG. 2, the viewable real environment (represented symbolically at 228) includes real objects 236 and 238 in a room, and includes currently viewable portion 230-A and portions 230-B and 230-C which are currently outside the field of view of the device. Currently viewable portion 230-A of real environment 228 can appear in synthetic scene 232 presented on display 226 in accordance with orientation 234-A of the device. The combination of synthetic data and real environment data to generate synthetic scene 232 is performed in software in the electronic device, as will be discussed below.

Figure 3A:
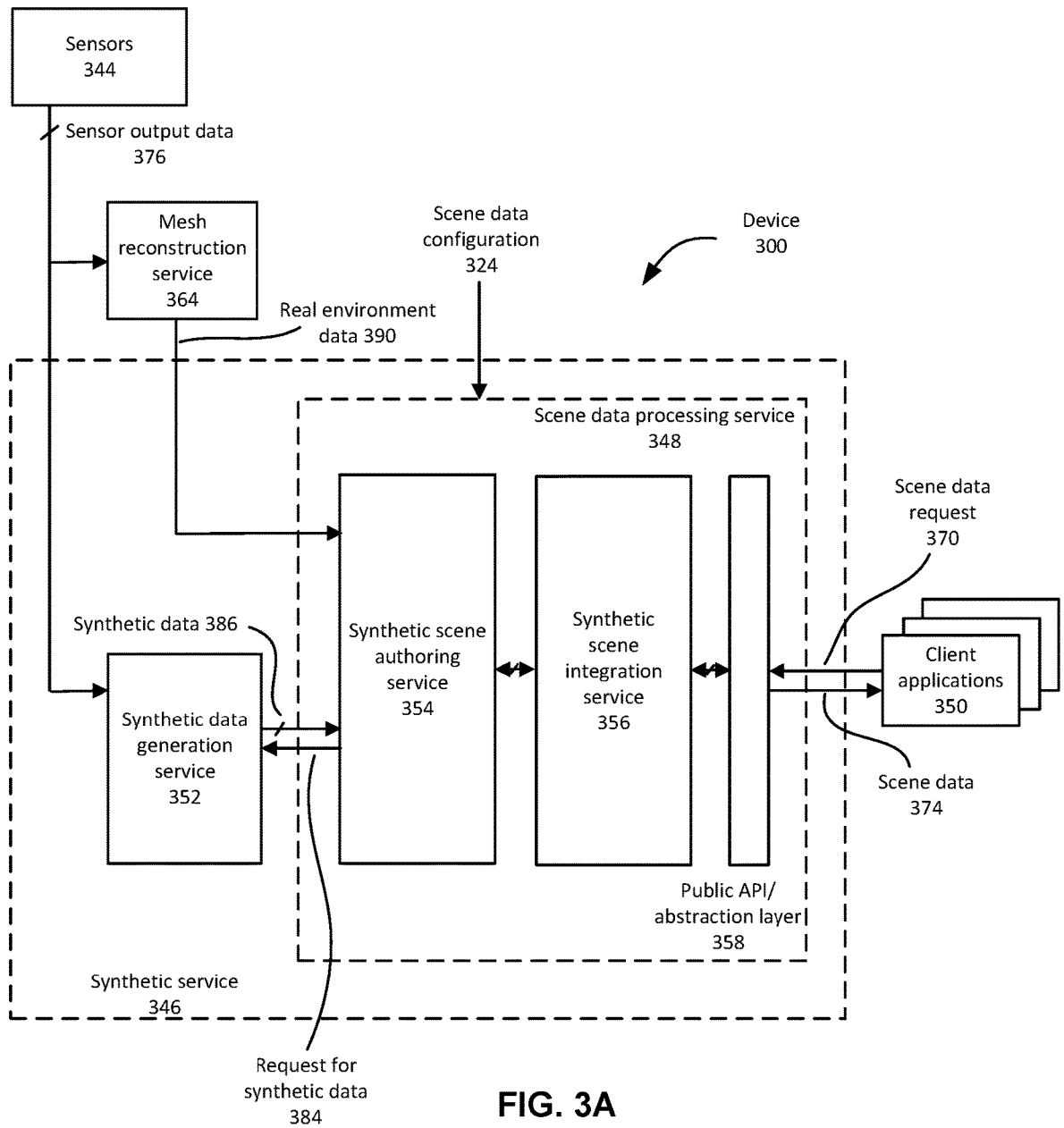
FIG. 3A illustrates an example functional block diagram of operations performed in electronic device, including a synthetic service in communication with one or more sensors and one or more client applications in accordance with some examples of the disclosure.

FIG. 3A illustrates an example functional block diagram of operations performed in electronic device 300 (e.g., device 100A or 100B of FIGS. 1A-1B), including synthetic service 346 in communication with one or more sensors 344 and one or more client applications 350 in accordance with some examples of the disclosure. Although FIG. 3A illustrates one specific example using mesh reconstruction to combine synthetic and real environment data and generate a synthetic scene, in other examples the combining of synthetic and real environment data can be performed using other types of data with a similar data flow as in FIG. 3A. Synthetic service 346 can enable a developer to author/modify a synthetic scene that can be presented on a display of the electronic device and used in conjunction with one or more client applications 350. Sensors 344 can include, but are not limited to, cameras, location sensors, depth sensors (e.g., light detection and ranging (LIDAR) sensors), gaze detection sensors, accelerometers, orientation sensors, magnetometers, and the like, and can generate sensor output data 376. In other examples, Computer Vision techniques can be used to extract other information from the environment, and photogrammetry can be used to extract textures and colors from the environment. In the example of FIG. 3A, mesh reconstruction service 364 can generate real environment data 390 from sensor output data, and forward the real environment data to synthetic service 346. Synthetic service 346 can include synthetic data generation service 352 for generating synthetic data 386 and scene data processing service 348 for enhancing, configuring and integrating both actual real environment data and the synthetic data, and providing scene data 374 to client applications 350.

In some examples, scene data configuration 324 can be authored and provided by an application developer (e.g., via a command line or other input mechanism) to scene data processing service 348 within synthetic service 346. Scene data configuration 324 can include attributes of a modified synthetic scene that a developer wants to use to test and debug a particular XR application, and can include a synthetic data configuration and a real environment data configuration. The synthetic data configuration can specify one or more types of synthetic data for the synthetic scene, such as synthetic real environment data, synthetic authored environment data, or synthetic authored scene understanding data. The real environment data configuration can specify one or more types of real environment data, such as real environment scene data, real environment location data, real environment orientation data, and real environment anchoring data derived from sensors 344. Different combinations of the above-described synthetic data 386 and real environment data can be specified by the developer using scene data configuration 324 to create the desired synthetic scene for testing and debugging XR applications.

As noted above, a client XR application may request scene data from a synthetic service in order to render a synthetic scene and run the application. In some examples, scene data processing service 348 can include a daemon or process in public API/abstraction layer 358 that listens for scene data request 370 from client application 350. Upon receiving this request, synthetic scene integration service 356 can collect, modify, integrate and/or combine post-algorithm synthetic data 386 and post-algorithm real environment data 390 as specified by scene data configuration 324 and any added scene understanding and alignment metadata. Synthetic data 386, having been enhanced with addition of scene understanding and alignment metadata in synthetic scene integration service 356, can then be formatted (e.g., packaged into a file format or data structure such as Universal Scene Description (USD)) and abstracted in public API/abstraction layer 358 for downstream manipulation and rendering. Public API/abstraction layer 358 can generate platform agnostic data (e.g., standardized ways of defining a plane, etc.) that is presented in a common interface. This modified scene data 374 can then be returned to one or more client applications 350. In one example, client application 350 can be a compositing engine for rendering scene data 374 for presentation on a display of the device. An XR application can then be operated and tested by the developer within the presented synthetic scene.

The presentation of the real environment (e.g., the environment that the developer and device are presently located in) on a display of device 300 starts with the generation of sensor output data 376 from sensors 344 on the device. In some examples, sensor output data 376 can include, but is not limited to, camera data, depth data (e.g., point cloud data), eye gaze data, accelerometer data, and the like.

Some sensor output data 376 (e.g., point cloud data from depth sensors) can be converted to mesh model geometries using mesh reconstruction algorithms in mesh reconstruction service 364 to generate post-algorithm real environment data 390. Real environment data 390 can include mesh reconstruction geometry data (e.g., vertices, triangles, planes and the like), and also non-scene data such as real environment location data and real environment orientation data. Real environment data 390 can be packaged and serialized into a file format or data structure such as Universal Scene Description (USD).

In some examples, a developer can utilize various software tools within scene data processing service 348 or outside synthetic service 346 to author and add scene understanding metadata to real environment data 390 as it is being presented as part of the synthetic scene on the display. (If the software tools are outside synthetic service 346, they should conform to a specified scene format defined by the synthetic service.) In some examples, scene understanding metadata can be provided interactively, via input mechanisms available to the developer while using electronic device 300. Scene understanding metadata can include, but is not limited to, material metadata (e.g., wood, metal, plastic, glass, fabric, etc.) associated with particular mesh reconstruction geometries, classification metadata (e.g., wall, floor, table, chair, etc.) associated with particular mesh reconstruction geometries, and type metadata (e.g., synthetic real environment data) associated with particular mesh reconstruction geometries. In an illustrative example, a developer can tag a real table being presented on the display with metadata indicating that it is a table made out of wood. Client applications 350 under test may thereafter be able to interact in various ways with synthetic scenes generated from real environment data 390 that have been enhanced by the addition of scene understanding metadata.

In some examples, a developer can also utilize the various software tools within scene data processing service 348 to author and add alignment metadata to real environment data 390 as it is being presented as part of the synthetic scene on the display. In some examples, alignment metadata can be provided interactively, via input mechanisms available to the developer while using electronic device 300. Alignment metadata can include alignment metadata (e.g., an anchor point such as a recognizable pattern that can be recognized by Computer Vision algorithms as a desired origin for synthetic data in the real environment, etc.), so that real environment data 390 can be aligned in some respect with synthetic data being rendered. In an illustrative example, a developer can establish an origin and XYZ axes for real environment data 390 in a corner of a room being presented on the display. Client applications under test may thereafter be able to interact in various ways with synthetic scenes generated from real environment data 390 having a frame of reference as provided by the addition of alignment metadata.

As enhanced by one or both of scene understanding metadata and alignment metadata, real environment data 390 (representing the real environment) can be combined with synthetic data 386 from synthetic data generation service 352 and accumulated in synthetic scene integration service 356 to produce scene data 374 for presentation as a synthetic scene on a display. In one example, client application 350 can receive scene data 374 and render a synthetic scene from the scene data.

Figure 3B:
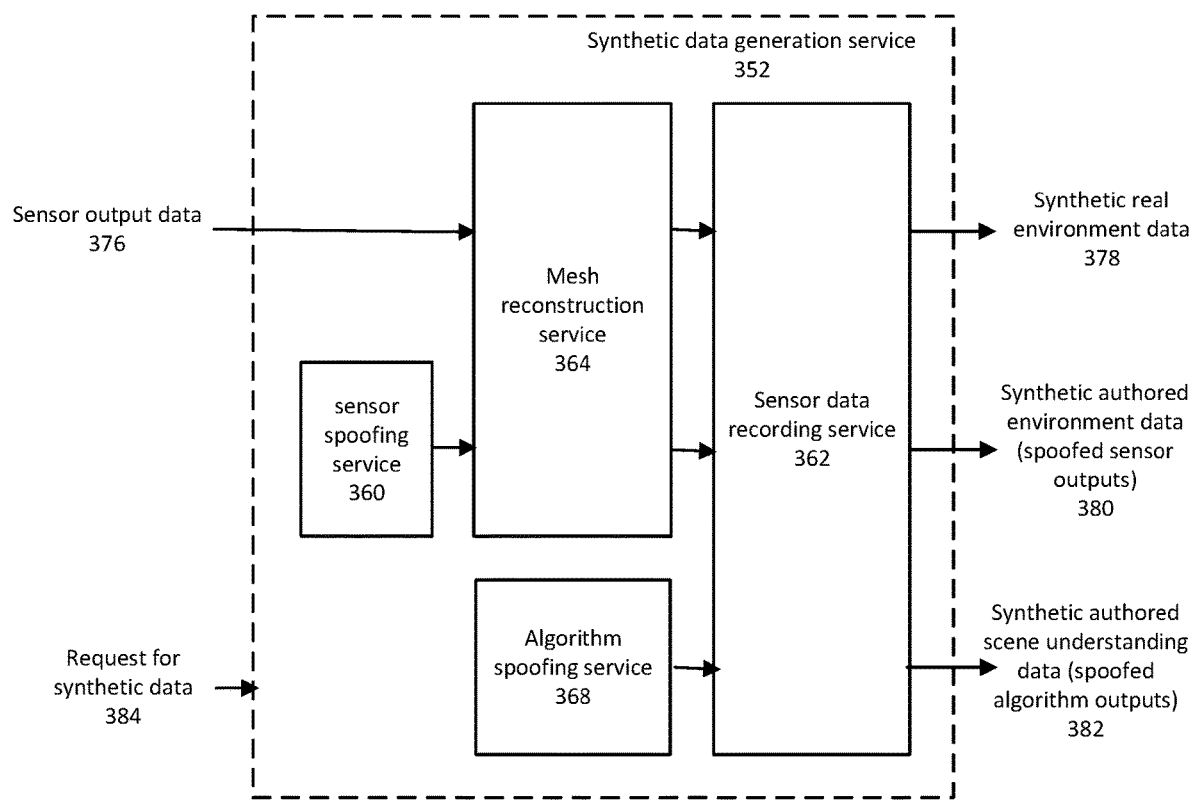
FIG. 3B illustrates an example block diagram of a synthetic data generation service for generating and providing synthetic data in accordance with some examples of the disclosure.

FIG. 3B illustrates an example block diagram of synthetic data generation service 352 for generating and providing synthetic data 386 (see FIG. 3A) in accordance with some examples of the disclosure. In general, synthetic data generation service 352 can receive sensor output data 376 and generate synthetic real environment data 378. Although synthetic real environment data 378 is derived from sensor output data 376, it is nevertheless labeled as "synthetic" because it represents previously captured and stored real environment data, in contrast with "live" real environment data 390 (see FIG. 3A) representing the current real environment data for more immediate rendering and presentation on the display. Synthetic data generation service 352 can also employ software to spoof sensor outputs and generate synthetic authored environment data 380, or spoof scene understanding algorithm outputs and generate synthetic authored scene understanding data 382. In some examples, one or more of synthetic real environment data 378, synthetic authored environment data 380, and synthetic authored scene understanding data 382 (collectively, synthetic data 386 in FIG. 3A) may be generated in accordance with scene data configuration 324 after a request for synthetic data 384 is received at synthetic data generation service 352.

As noted above, synthetic real environment data 378 represents previously captured and stored real environment data. To accomplish this, prior to testing an XR application, the device can be operated in a real environment, and sensor output data 376 (e.g., camera data, depth data (e.g., point cloud data), eye gaze data, accelerometer data, and the like, which are representative of a real object or a real environment) can be generated. For example, a developer can change the orientation of the device to perform a scan (e.g., a 360 degree scan) of the real environment. Sensor output data 376 can then be converted to mesh model geometries using mesh reconstruction algorithms in mesh reconstruction service 364, and the resultant mesh geometry data can be captured and saved in sensor data recording service 362 to generate post-algorithm synthetic real environment data 378. Because downstream client applications may start and run at different times, the accumulated post-algorithm synthetic real environment data 378 can advantageously improve processing efficiency because the data can be stored and sent to the client applications on an as-needed basis. Synthetic real environment data 378 can include mesh reconstruction geometry data (e.g., vertices, triangles, planes and the like), and also non-scene data such as synthetic real environment location data and synthetic real environment orientation data. When rendered, synthetic real environment data 378 can be treated by client applications as though it were "live" real environment data from sensors 344 (see FIG. 3A).

In some examples, synthetic data can also be generated by spoofing sensor output data. To accomplish this, synthetic data generation service 352 can include sensor spoofing service 360, which can generate synthetic object or synthetic environment data by using software (e.g., Digital Content Creation (DCC) tools) to "spoof" sensor outputs and generate the same (or similar) sensor output data that would have been generated by sensors 344 in a real environment. For example, a developer can utilize various software tools within sensor spoofing service 360 (in some examples using input mechanisms available through electronic device 300) to author synthetic sensor output data, including one or more of synthetic camera data, synthetic depth data (e.g., point cloud data), synthetic eye gaze data, synthetic accelerometer data, and the like, which are representative of a synthetic object or synthetic environment. In other examples, synthetic sensor output data can be created externally and imported into sensor spoofing service 360. In either case, the synthetic sensor output data can be converted to mesh model geometries using mesh reconstruction algorithms in mesh reconstruction service 364, and the resultant mesh geometry data can be captured and saved in sensor data recording service 362 to generate post-algorithm synthetic authored environment data 380. Synthetic authored environment data 380 can include mesh reconstruction geometry data (e.g., vertices, triangles, planes and the like), and also non-scene data such as synthetic real environment location data and synthetic real environment orientation data. Synthetic authored environment data 380 can be treated by client applications as though it were real environment data from sensors 344, though actually generated by software.

In some examples, synthetic data can also be generated by spoofing algorithm outputs. To accomplish this, synthetic data generation service 352 can include algorithm spoofing service 368. Algorithm spoofing service 368 can generate synthetic object or synthetic environment data by using software to "spoof" the outputs of algorithms (typically used to convert synthetic data such as point cloud data to mesh model geometries (e.g., 3D triangles)) without the need to first generate synthetic sensor data (as in sensor spoofing service 360) and convert that synthetic sensor data to mesh model geometries using mesh reconstruction algorithms (as in mesh reconstruction service 364). For example, a developer can configure algorithm spoofing service 368 (in some examples using input mechanisms available through electronic device 300) to generate synthetic sensor output data that includes mesh reconstruction geometry data (e.g., vertices, triangles, planes, and the like) and also non-scene data such as synthetic authored scene understanding location data and synthetic authored scene understanding orientation data. The synthetic sensor output data can be captured and saved in sensor data recording service 362 to generate synthetic authored scene understanding data 382. When rendered, synthetic authored scene understanding data 382 can be treated by XR applications as though it were real environment data from sensors 344, though actually generated by software.

Referring again to FIG. 3A, in some examples a developer can utilize various software tools within synthetic scene authoring service 354 (in some examples using input mechanisms available through electronic device 300) to author and add scene understanding metadata to synthetic data 386 (e.g., synthetic real environment data 378, synthetic authored environment data 380, or synthetic authored scene understanding data 382). In some examples, scene understanding metadata can be provided via scene data configuration 324, via a file or other previously generation input, and in other examples, the scene understanding metadata can be provided interactively, via input mechanisms available to the developer while using electronic device 300. Scene understanding metadata can include, but is not limited to, material metadata (e.g., wood, metal, plastic, glass, fabric, etc.) associated with a particular mesh reconstruction geometry, classification metadata (e.g., wall, floor, table, chair, etc.) associated with a particular mesh reconstruction geometry, and type metadata (e.g., synthetic real environment data) associated with a particular mesh reconstruction geometry. Scene understanding metadata can also include various identifiers or tags, which in some examples can identify synthetic data 386 as being of a particular synthetic data type (e.g., synthetic real environment data, synthetic authored environment data, or synthetic authored scene understanding data), and/or identify the data itself as being of a particular geometry type (e.g., mesh, plane, vertex, etc.). This tagging can enable downstream systems to properly interpret the data, such as understanding that the data is of type "mesh" and therefore treating the data as scene understanding mesh. Client applications under test may thereafter be able to interact in various ways with synthetic scenes generated from synthetic data 386 that has been enhanced by the addition of scene understanding metadata.

In addition, a developer can utilize various software tools within synthetic scene authoring service 354 (in some examples using input mechanisms available through electronic device 300) to add alignment metadata (e.g., an anchor point, an origin, etc.) to synthetic data 386, so that the synthetic data can later be aligned in some respect with real environment data being rendered (e.g., the synthetic scene rendered from synthetic data 386 and presented on the display of the device can be oriented in the same direction as the orientation of the device in the real environment). In some examples, alignment metadata can be provided via scene data configuration 324, via a file or other previously generation input, and in other examples, the alignment metadata can be provided interactively, via input mechanisms available to the developer while using electronic device 300.

Synthetic scene integration service 356 can enable a developer to integrate the generated synthetic data 386 with real environment data 390 to build an XR experience for testing an XR application. For example, a developer can specify a synthetic data configuration within scene data configuration 324 instructing that synthetic real environment data 378 (see FIG. 3B) is to be used when creating the synthetic scene. In accordance with that instruction, synthetic real environment data 378 (representing a previously captured synthetic scene of a real environment) can be combined with some of the real environment data from sensors 344 and accumulated in synthetic scene integration service 356 to produce scene data 374 for subsequent presentation as a synthetic scene on a display.

The combining of synthetic real environment data 378 with some of the real environment data can by performed in one instance by replacing most of the real environment data (e.g., derived from the sensors in the device in real time) with synthetic real environment data representing a previously captured synthetic scene of a real environment that is different from the present real environment. In an illustrative example, a developer can load a synthetic scene comprised of synthetic real environment data 378 captured from one location (e.g., a synthetic office), and test an XR application in that synthetic office scene, even though the developer may be using the device in another location (e.g., at home). This ability to load a pre-processed synthetic scene can eliminate the need to run expensive scene understanding algorithms to generate the scene in real time.

In this instance, some of the real environment data associated with the developer's current home environment (e.g., one or more of real environment location data, real environment orientation data, and real environment anchoring data) may be combined with synthetic real environment data 378 for the previously captured office environment. For example, a developer-specified anchor point for the synthetic office can be aligned with a developer-specified anchor point for the developer's home environment to enable the synthetic office to be anchored within the home environment. Thereafter, while the synthetic office is rendered and presented on a display, the synthetic office can be updated in accordance with movement of the device within the home environment (and in accordance with changes to the real environment location data and/or the real environment orientation data as detected by sensors 344). In other words, real environment orientation data and real environment anchoring data can be used to maintain tracking stability of the rendered synthetic office as the developer moves around in the home environment. The synthetic office's post-algorithm mesh reconstruction geometry data, along with any added scene understanding data, can allow the XR application to interact with the synthetic office as though it were a real office. In this example, a developer can advantageously use a device at home to test an XR application interacting with a synthetic office that is not actually present in the developer's home.

The combining of synthetic real environment data 378 with some of the real environment data can by performed in another instance by replacing most of the real environment data (e.g., derived from the sensors in the device in real time) with synthetic real environment data representing a previously captured synthetic scene of the same environment. In some examples, a synthetic object can also be added to the synthetic real environment data. In an illustrative example, a developer can load a synthetic scene comprised of synthetic real environment data 378 captured from one location (e.g., a synthetic office), and test an XR application in that synthetic office scene, even though the developer may be using the device in the developer's actual office. This ability to load a pre-processed synthetic scene can eliminate the need to run expensive scene understanding algorithms to generate the scene in real time.

In this instance, some of the real environment data associated with the developer's present office environment (e.g., one or more of real environment location data, real environment orientation data, and real environment anchoring data) may be combined with synthetic real environment data 378 for the previously captured office environment. For example, a developer-specified anchor point for the synthetic office can be aligned with a developer-specified anchor point for the developer's present office environment to enable the synthetic office to be anchored within the present office environment. Thereafter, while the synthetic office is rendered and presented on a display, the synthetic office can be updated in accordance with movement of the device within the present home environment (and in accordance with changes to the real environment location data and/or the real environment orientation data as detected by sensors 344). The synthetic office's post-algorithm mesh reconstruction geometry data, along with any added scene understanding data, can allow the XR application to interact with the synthetic office as though it were a real office. In this example, a developer can advantageously use a device in the office to test an XR application interacting with a synthetic office. The developer can make modifications to various attributes of the synthetic office (e.g., add synthetic objects to the synthetic office) while iteratively testing the XR application (e.g., to test detection of the added synthetic object). These test modifications would not be possible if the XR application was being testing in the actual office environment.

In another example, a developer can specify a synthetic data configuration within scene data configuration 324 that instructs that synthetic authored environment data 380 (see FIG. 3B) is to be used when creating the synthetic scene. In accordance with that instruction, post-algorithm synthetic authored environment data 380 can be combined with at least some of real environment data 390 from sensors 344 and accumulated in synthetic scene integration service 356 to produce scene data 374 for subsequent presentation as a synthetic scene on a display.

The combining of synthetic authored environment data 380 and at least some of the real environment data can be performed in one instance by adding the synthetic authored environment data to the real environment data. In an illustrative example, a developer can utilize various software tools within scene data processing service 348 (in some examples using input mechanisms available through electronic device 300) to add previously generated synthetic authored environment data 380 (e.g., a synthetic table) to real environment data 390 (e.g., actual real environment data representing a room that the developer (and device) are presently located in). A developer-specified anchor point for the synthetic table can be aligned with a developer-specified anchor point for the room to enable the synthetic table to be anchored within the room. Thereafter, while the synthetic scene (including the synthetic table anchored within the room) is rendered and presented on a display, the synthetic scene can be updated in accordance with movement of the device within the room (and in accordance with changes to the real environment location data and/or the real environment orientation data as detected by sensors 344). The synthetic table's post-algorithm mesh reconstruction geometry data, along with any added scene understanding data, can allow the XR application to interact with the synthetic table as though it were a real table. In this example, a developer can advantageously use a device at home to test an XR application interacting with a synthetic table that is not actually present in the developer's home.

The combining of synthetic authored environment data 380 and at least some of the real environment data can also be performed by replacing some of the real environment data with the synthetic authored environment data. In another illustrative example, a developer can tag previously generated synthetic authored environment data 380 (e.g., a synthetic table) with classification metadata of a particular type (e.g., classification type "table"), and similarly tag a real table in the real environment with classification metadata indicating that the real table is also of classification type "table." Because they have the same classification, the real table in the real environment can be replaced with the previously generated synthetic table. (In general, synthetic and real objects of the same classification type can be swapped.) The synthetic table's post-algorithm mesh reconstruction geometry data, along with any added scene understanding metadata, can allow the XR application to interact with the synthetic table as though it were a real table. In this example, a developer can advantageously use a device at home to test an XR application interacting with a synthetic table that has replaced a real table present in the developer's home.

In yet another example, a developer can specify a synthetic data configuration within scene data configuration 324 that instructs that synthetic authored scene understanding data 382 is to be used when creating the synthetic scene. In accordance with that instruction, synthetic authored scene understanding data 382 can be combined with at least some of the real environment data from sensors 344 and accumulated in synthetic scene integration service 356 to produce scene data 374 for subsequent presentation as a synthetic scene on a display.

The combining of synthetic authored scene understanding data 382 and at least some of the real environment data can be performed in one instance by adding the synthetic authored scene understanding data to the real environment data. In an illustrative example, a developer can utilize various software tools within scene data processing service 348 (in some examples using input mechanisms available through electronic device 300) to add previously generated synthetic authored scene understanding data 382 (e.g., a synthetic table) to real environment data (e.g., actual real environment data representing a room that the developer (and device) are located in). A developer-specified anchor point for the synthetic table can be aligned with a developer-specified anchor point for the room to enable the synthetic table to be anchored within the room. While the synthetic scene (including the synthetic table anchored within the room) is rendered and presented on a display, the synthetic scene can be updated in accordance with movement of the device (and in accordance with changes to the real environment location data and/or the real environment orientation data as detected by sensors 344). The synthetic table's mesh reconstruction geometry data, along with any added scene understanding data, can allow the XR application to interact with the synthetic table as though it were a real table. In this example, a developer can advantageously use a device at home to test an XR application interacting with a synthetic table that is not actually present in the developer's home.

The combining of synthetic authored scene understanding data 382 and at least some of the real environment data can also be performed by replacing some of the real environment data with the synthetic authored scene understanding data. In another illustrative example, a developer can tag previously generated synthetic authored scene understanding data 382 (e.g., a synthetic table) with classification metadata of a particular type (e.g., classification type "table"), and similarly tag a real table in the real environment with classification metadata indicating that the real table is also of classification type "table." Because they have the same classification, the real table in the real environment can be replaced with the previously generated synthetic table. The synthetic table's mesh reconstruction geometry data, along with any added scene understanding metadata, can allow the XR application to interact with the synthetic table as though it were a real table. In this example, a developer can advantageously use a device at home to test an XR application interacting with a synthetic table that has replaced a real table present in the developer's home. More generally, in some examples of the disclosure, a developer can author logic within the synthetic service to replace synthetic and real objects according to their metadata classification.

Figure 4A:
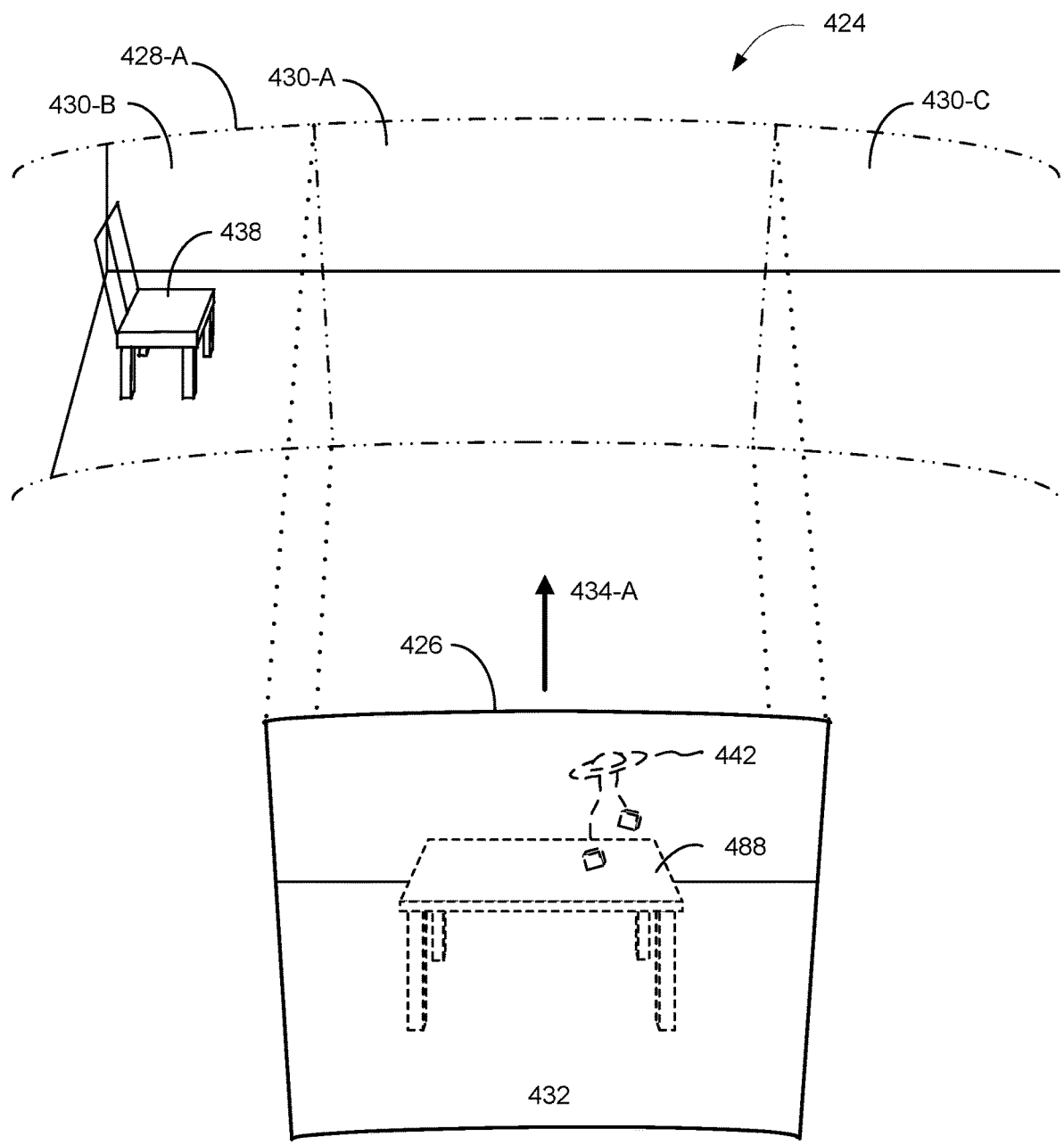
FIGS. 4A-4B illustrate an example of an XR application being tested in a synthetic scene 4 being presented on a display of an electronic device according to some embodiments of the disclosure.
Figure 4B:
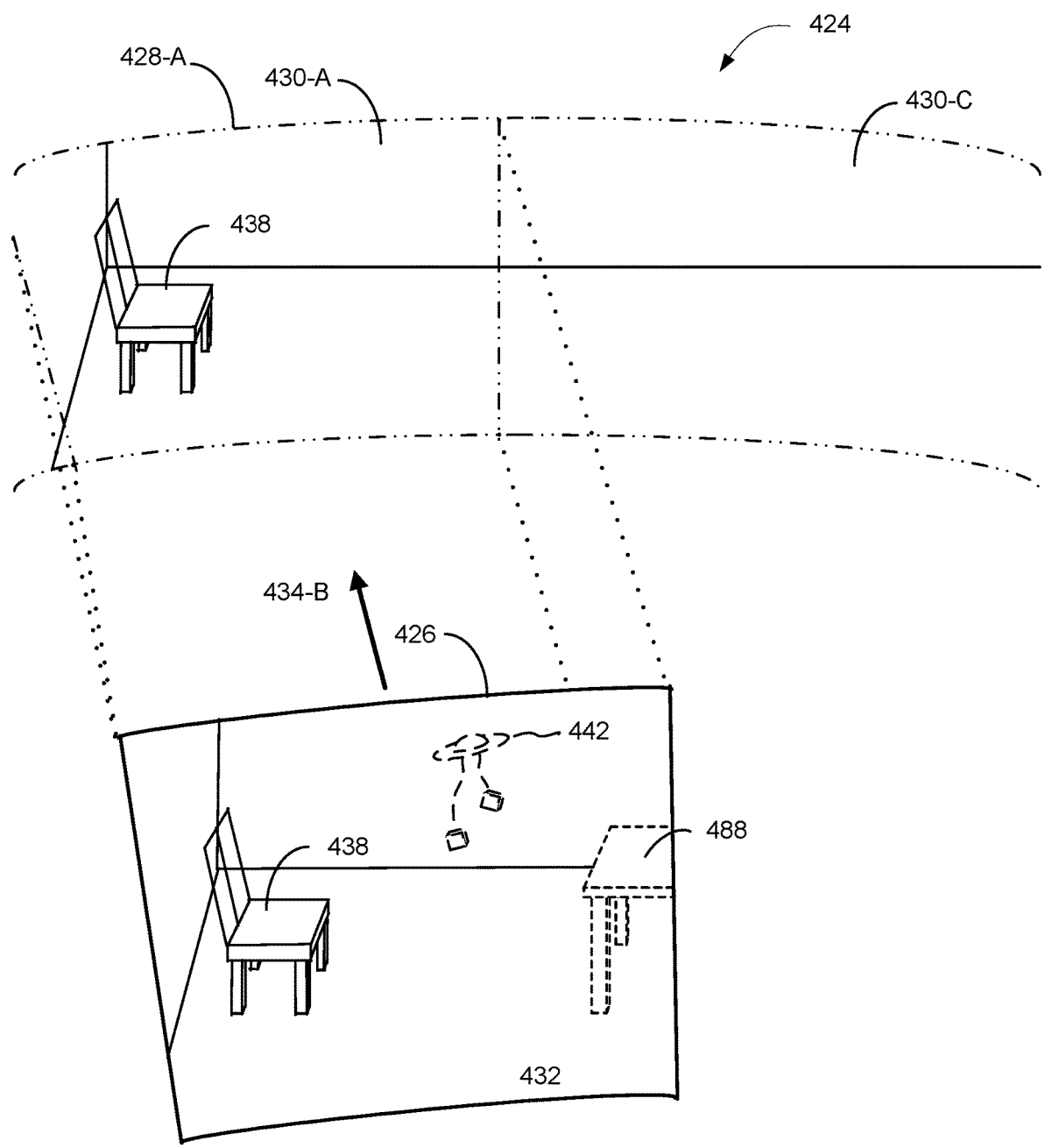

FIGS. 4A-4B illustrate an example of an XR application being tested in a synthetic scene 432 being presented on a display 426 of an electronic device according to some embodiments of the disclosure. In the example of FIG. 4A, the device is positioned in orientation 434-A, resulting in only viewable portion 430-A of viewable real environment 428-A being presented on display 426, with portions 430-B and 430-C remaining outside the field of view of the device. Real object 438 (e.g., a chair) in portion 430-B also remains outside the field of view of the device, and therefore does not appear in synthetic scene 432. XR application (indicated symbolically at 442) can be tested in synthetic scene 432, which includes a combination of synthetic data and real environment data (e.g., synthetic object 488 combined with viewable portion 430-A of real environment 428-A).

As discussed above, synthetic object 488 (e.g., a synthetic table) can be generated from synthetic authored environment data 380 that has been converted to mesh reconstruction geometry data (e.g., vertices, triangles, planes and the like), and may also include non-scene data such as synthetic anchoring data. In addition, synthetic object 488 can be assigned various attributes that can allow it, for example, to be treated as a real object that occludes other objects behind it. Because of this, the synthetic table can interact with XR application 442 as though it were a real object captured from sensors. In an illustrative example, if XR application 442 is designed to drop cubes from a spaceship, and if, for example, the application had physics collisions with scene understanding (real) data enabled, the cubes can bounce off the synthetic table as though it were a real table.

In the example of FIG. 4B, the device has been repositioned to orientation 434-B. As a result, viewable portion 430-A has shifted, causing real object 438 to now appear in the viewable portion and also appear in synthetic scene 432. In the present example, synthetic object 488 has been anchored to the real environment as discussed above. Accordingly, although the orientation of the device changes, synthetic object 488 remains in a fixed location with the real environment. XR application can continue to be tested within synthetic environment 432, even as orientation 434-B changes. In general, as a developer moves around in the real environment, causing orientation 434-B to change, synthetic scene 432 can change as synthetic objects and real objects appear or disappear in accordance with the changed orientation. XR application 442 can continue to interact with real and synthetic objects in the changing synthetic scene as though they were all real objects. In this example, a developer can advantageously use a device in one location to test an XR application interacting with a synthetic object that is not actually present at the developer's location. Furthermore, the developer can change the attributes of the synthetic object and effectively test the XR application interacting with different variations of the synthetic object.

Figure 4C:
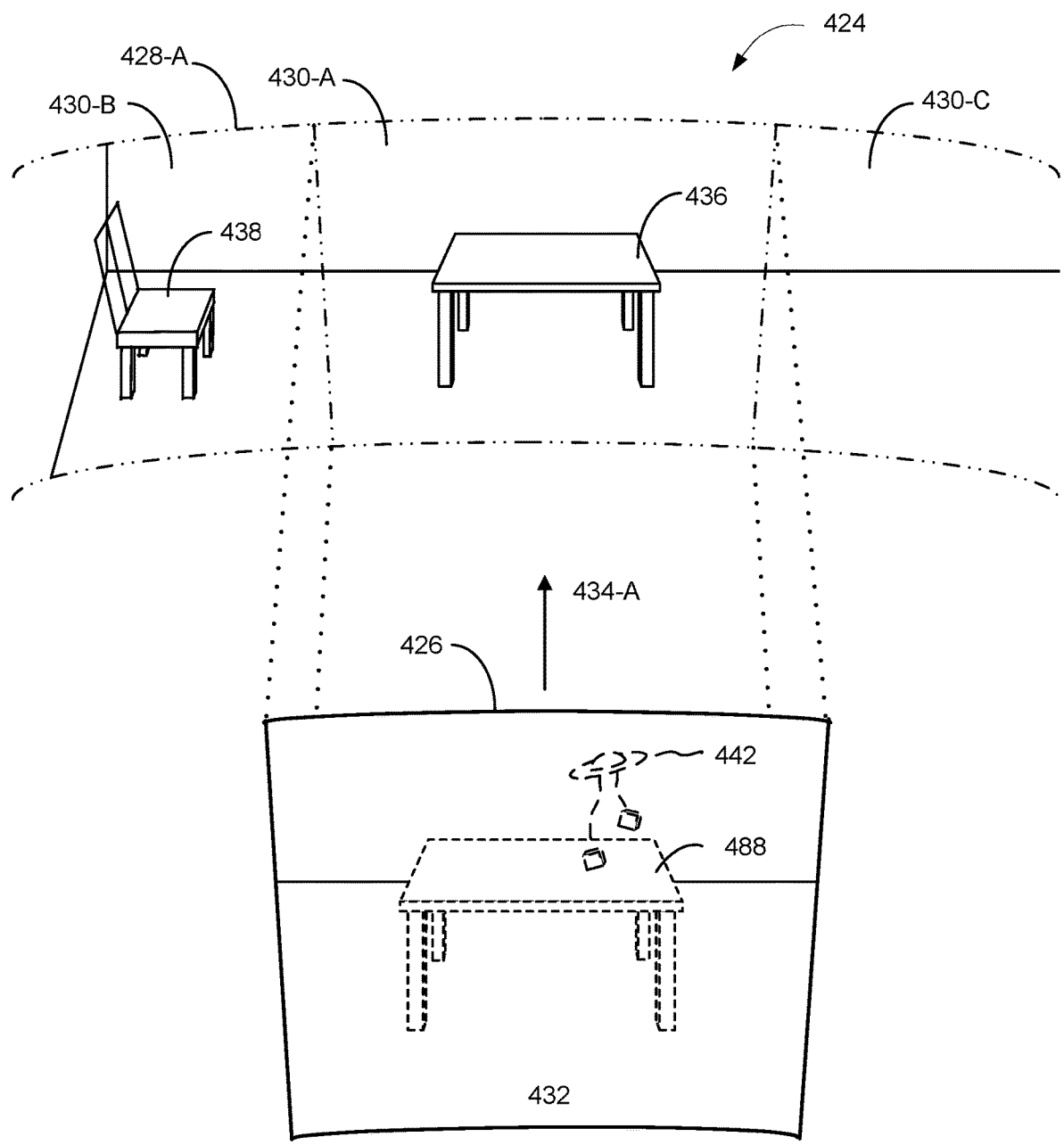
FIGS. 4C-4D illustrate an example of an XR application being tested in a synthetic scene being presented on a display of an electronic device according to some embodiments of the disclosure.
Figure 4D:
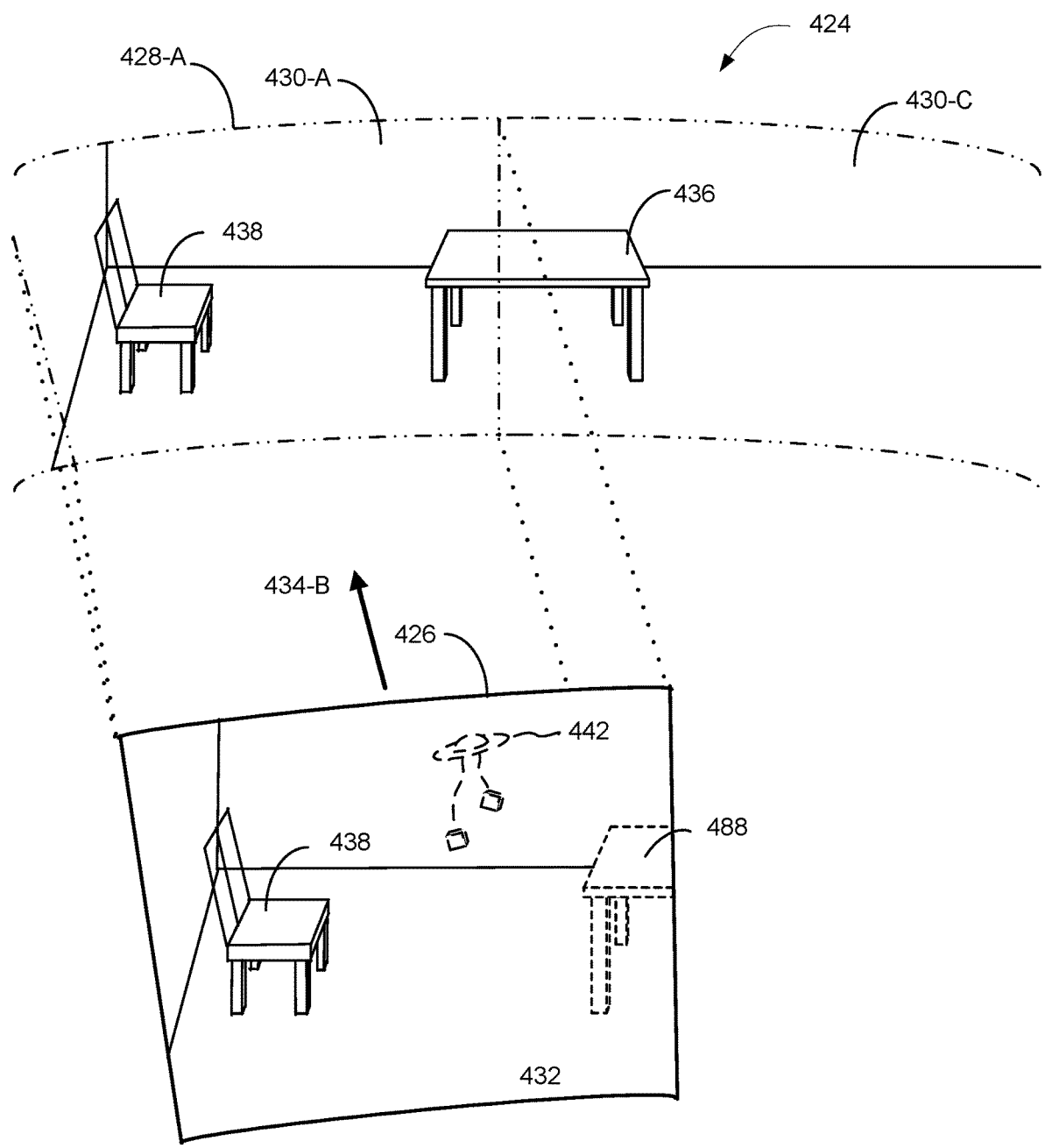

FIGS. 4C-4D illustrate an example of an XR application being tested in a synthetic scene 432 being presented on a display 426 of an electronic device according to some embodiments of the disclosure. In the example of FIG. 4C, the device is positioned in orientation 434-A, resulting in only viewable portion 430-A of viewable real environment 428-A being presented on display 426, with portions 430-B and 430-C remaining outside the field of view of the device. Real object 438 (e.g., a chair) in portion 430-B also remains outside the field of view of the device, and therefore does not appear in synthetic scene 432. Real object 436 (e.g., a table), in contrast, is within viewable portion 430-A, and therefore appears in synthetic scene 432. XR application 442 can be tested in synthetic scene 432, which includes a combination of synthetic data and real environment data (e.g., synthetic object 488 combined with viewable portion 430-A of real environment 428-A). However, unlike the examples of FIGS. 4A-4B, synthetic object 488 can replace real object 436.

In the example of FIG. 4D, the device has been repositioned to orientation 434-B. As a result, viewable portion 430-A has shifted, causing real object 438 to now appear in the viewable portion and also appear in synthetic scene 432. In the present example, synthetic object 488 has been anchored to the real environment as discussed above. Accordingly, although the orientation of the device changes, real object 438 remains in a fixed location with the real environment. XR application 442 can continue to be tested within synthetic scene 432, even as orientation 434-B changes. In general, as a developer moves around in the real environment, causing orientation 434-B to change, synthetic scene 432 can change as synthetic objects and real objects appear or disappear in accordance with the changed orientation. XR application 442 can continue to interact with real and synthetic objects in the changing synthetic scene as though they were all real objects. In this example, a developer can advantageously use a device in one location, replace a real object at that location with a synthetic object that is not actually present at the developer's location, and test an XR application interacting with that synthetic object. Furthermore, the developer can change the attributes of the synthetic object and effectively test the XR application interacting with different variations of the synthetic object.

Figure 4E:
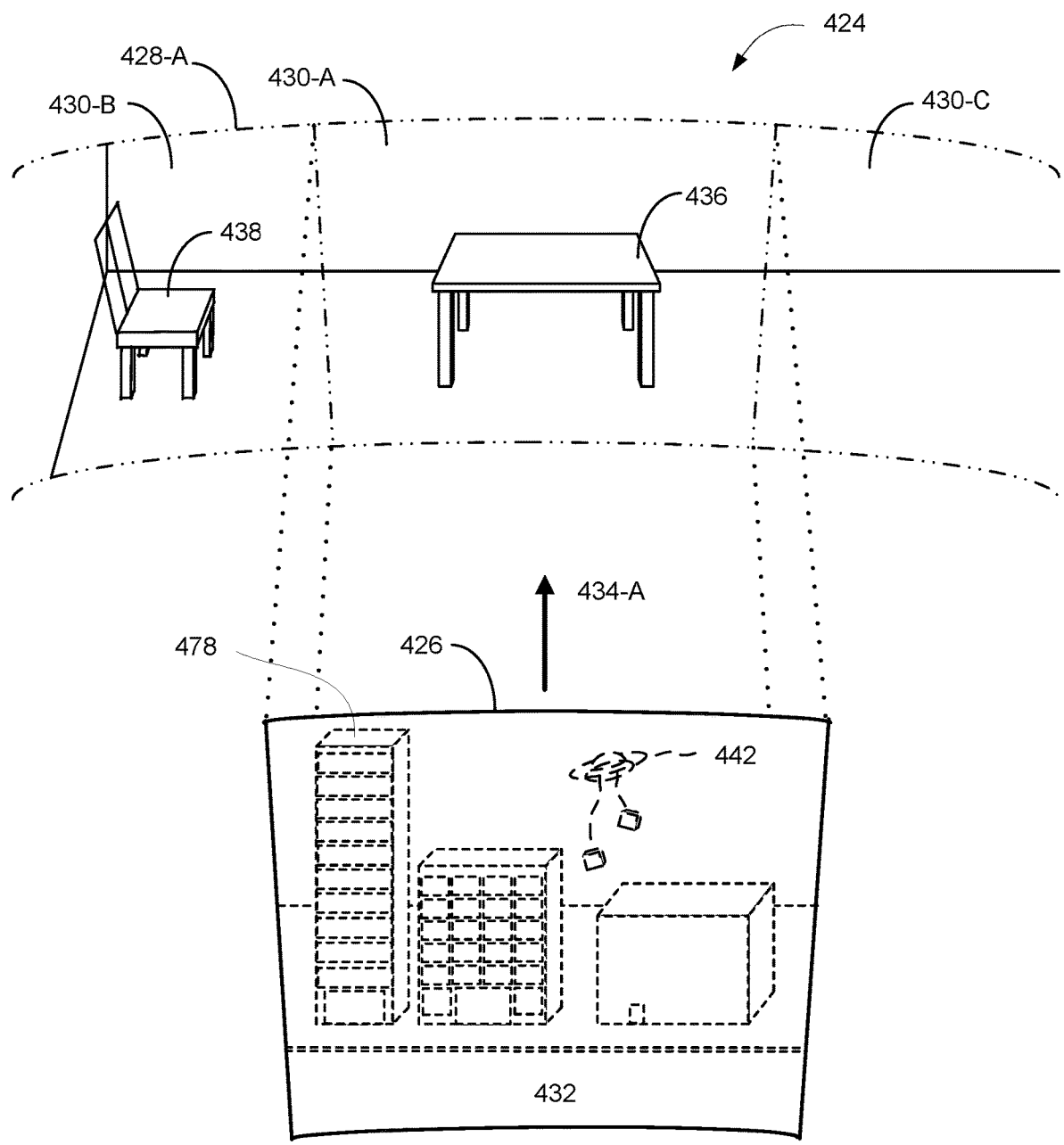
FIGS. 4E-4F illustrate an example of an XR application being tested in a synthetic scene being presented on a display of an electronic device according to some embodiments of the disclosure.
Figure 4F:
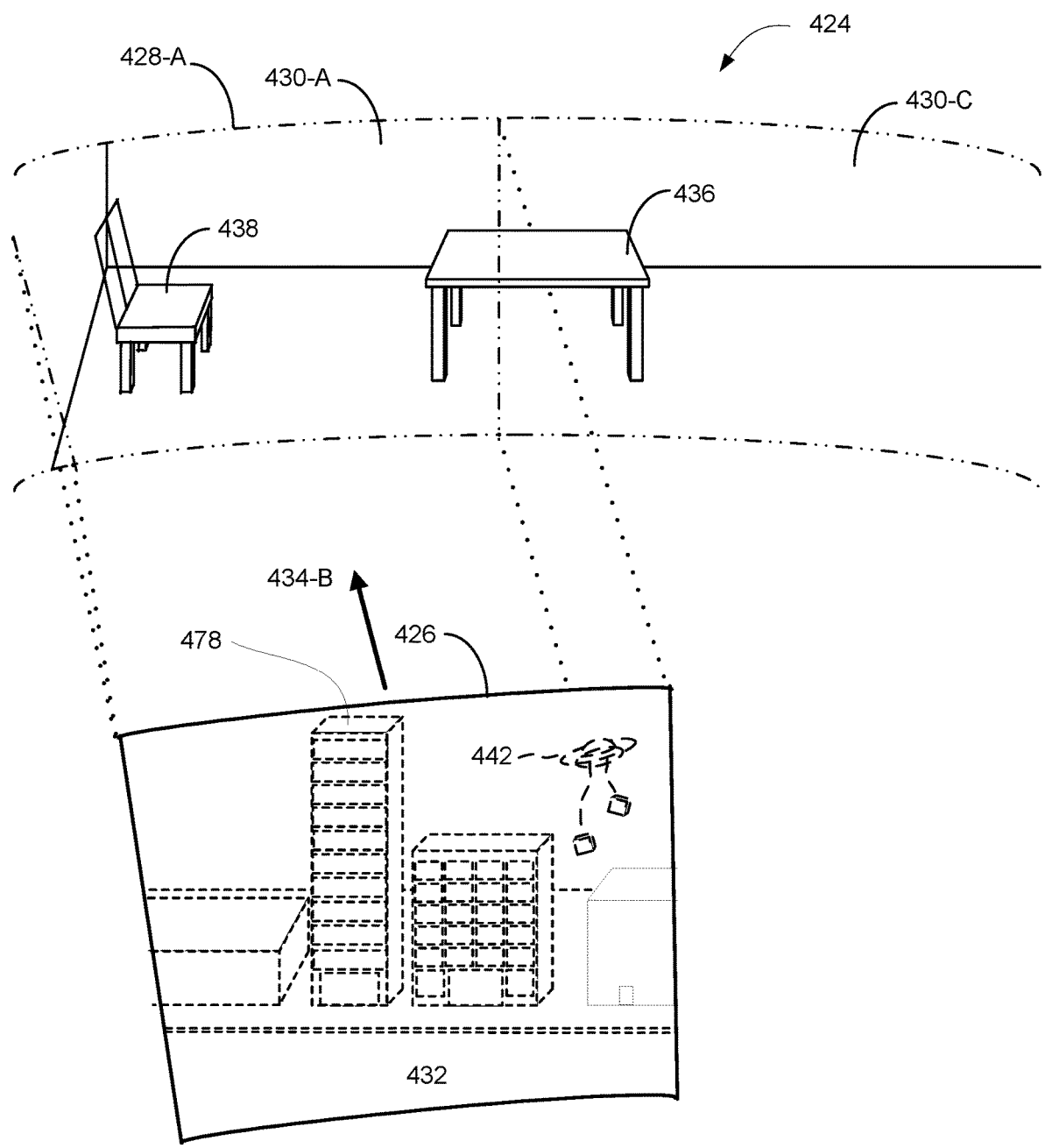

FIGS. 4E-4F illustrate an example of an XR application being tested in a synthetic scene 432 being presented on a display 426 of an electronic device according to some embodiments of the disclosure. In the example of FIG. 4E, the device is positioned in orientation 434-A, which would normally result in only a rendering of viewable portion 430-A (including real object 436 (e.g., a table)) of real environment 428-A being presented on display 426, with portions 430-B and 430-C (including real object 438 (e.g., a chair)) remaining outside the field of view of the device. However, in the example of FIG. 4E, viewable portion 430-A of real environment 428-A has been replaced by a rendering of synthetic real environment data 478 (e.g., a city), which is different from the present real environment. XR application 442 can thereafter be tested in synthetic scene 432.

In the example of FIG. 4F, the device has been repositioned to orientation 434-B. As a result, viewable portion 430-A of real environment 428-A has shifted, but as before, the viewable portion of the real environment has been replaced with a rendering of synthetic real environment data 478 (e.g., a city). In the present example, synthetic real environment data 478 has been anchored to the real environment as discussed above. Accordingly, as orientation of the device changes, synthetic real environment data 478 (e.g., the rendered view of the city) changes accordingly. XR application 442 can continue to be tested within synthetic scene 432, even as orientation 434-B changes and synthetic real environment data 478 correspondingly changes. In general, as a developer moves around in the real environment, causing orientation 434-B to change, synthetic scene 432 can change as synthetic objects appear or disappear in accordance with the changed orientation. XR application 442 can continue to interact with synthetic objects in the changing synthetic scene as though they were all real objects. In this example, a developer can advantageously use a device in one location, replace the real environment at that location with synthetic real environment data 478 of a previously captured real environment that is not actually present at the developer's location, and test an XR application interacting with that synthetic real environment. Furthermore, the developer can change the attributes of the synthetic real environment and effectively test the XR application interacting with different variations of the synthetic real environment.

Figure 4G:
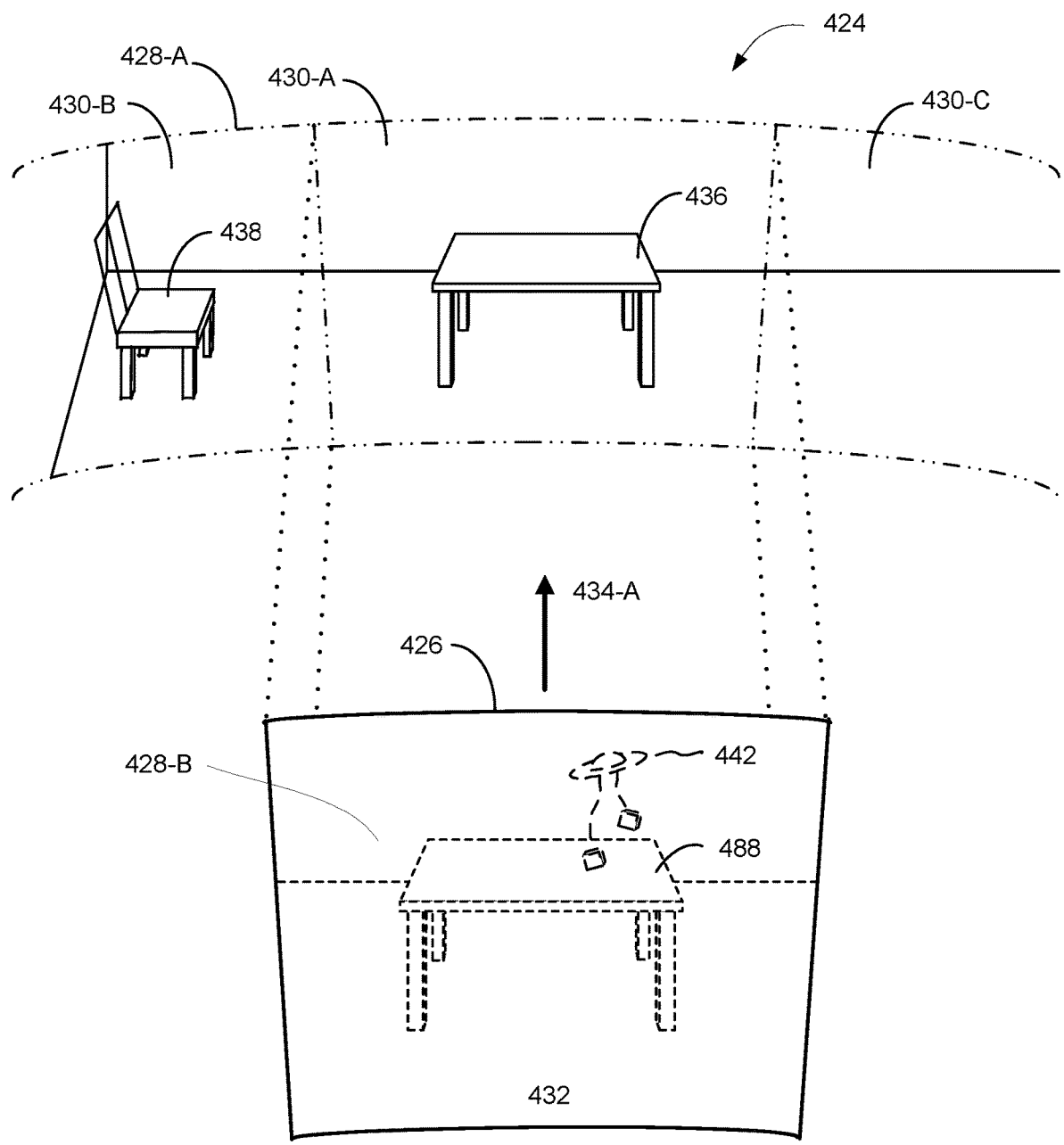
FIGS. 4G-4H illustrate an example of an XR application being tested in a synthetic scene being presented on a display of an electronic device according to some embodiments of the disclosure.
Figure 4H:
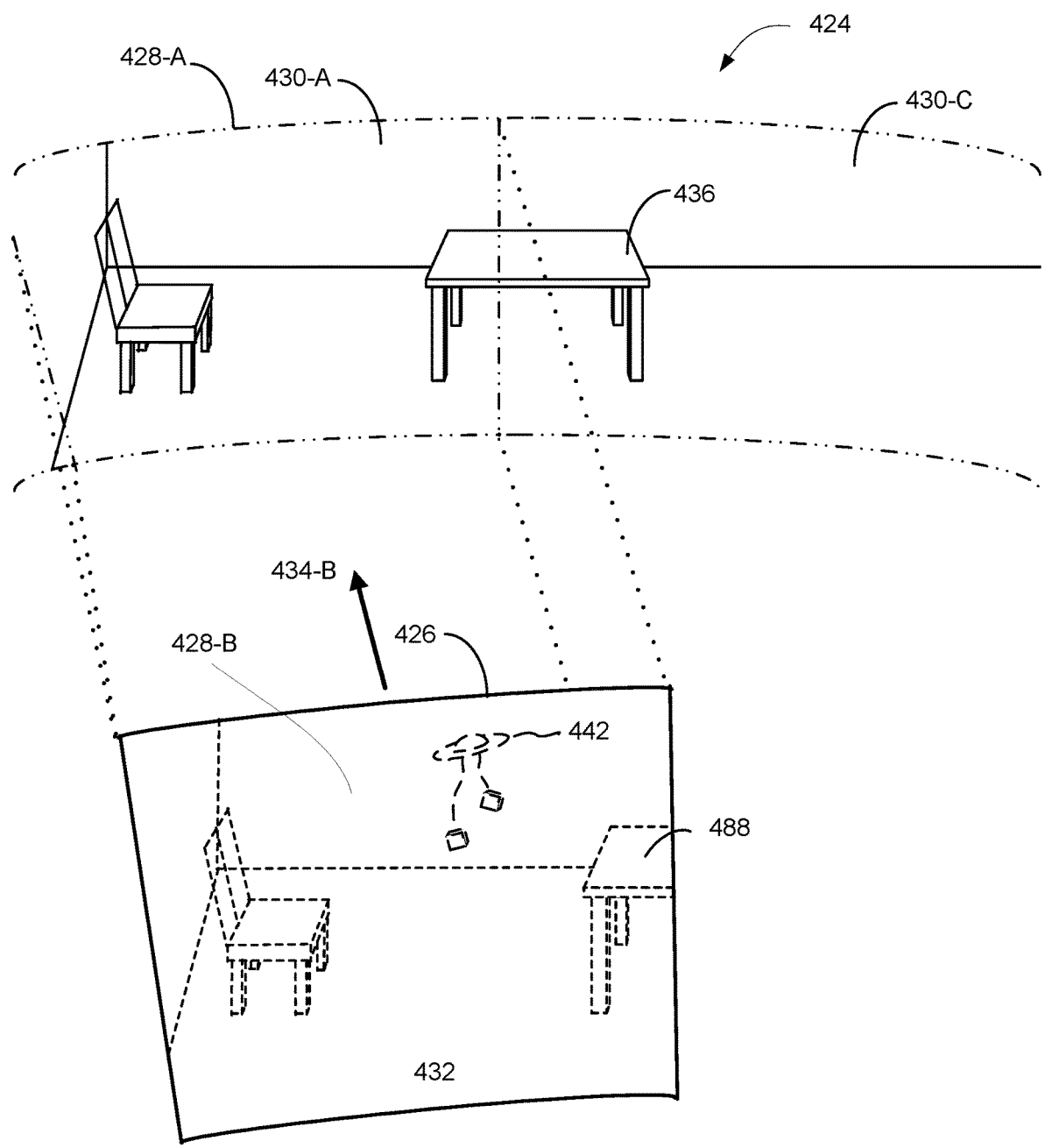

FIGS. 4G-4H illustrate an example of an XR application being tested in a synthetic scene 432 being presented on a display 426 of an electronic device according to some embodiments of the disclosure. In the example of FIG. 4G, the device is positioned in orientation 434-A, which would normally result in only a rendering of viewable portion 430-A (including real object 436 (e.g., a table)) of real environment 428-A being presented on display 426, with portions 430-B and 430-C (including real object 438 (e.g., a chair)) remaining outside the field of view of the device. However, in the example of FIG. 4G, viewable portion 430-A of real environment 428-A has been replaced by a rendering (synthetic scene 432) of a viewable portion of synthetic real environment data 428-B. Synthetic real environment data 428-B can represent previously captured real environment data of the same environment in which the developer and device are presently located. XR application 442 can thereafter be tested in synthetic scene 432.

In the example of FIG. 4H, the device has been repositioned to orientation 434-B. As a result, viewable portion 430-A of real environment 428-A has shifted, but as before, the viewable portion of the real environment has been replaced with a rendering of synthetic real environment data 428-B, which can represent previously captured real environment data of the same environment in which the developer and device are presently located. In the present example, synthetic real environment data 428-B has been anchored to the real environment as discussed above. Accordingly, as orientation of the device changes, synthetic real environment data 428-B changes accordingly. XR application 442 can continue to be tested within synthetic scene 432, even as orientation 434-B changes and synthetic real environment data 428-B correspondingly changes. In general, as a developer moves around in the real environment, causing orientation 434-B to change, synthetic scene 432 can change as synthetic objects appear or disappear in accordance with the changed orientation. XR application 442 can continue to interact with synthetic objects in the changing synthetic scene as though they were all real objects. In this example, a developer can advantageously use a device in one location, replace the real environment at that location with synthetic real environment data 478 of a previously captured real environment that is the same as the present real environment, and test an XR application interacting with that previously captured synthetic real environment. Furthermore, the developer can change the attributes of the previously captured synthetic real environment and effectively test the XR application interacting with different variations of the synthetic real environment.

Figure 5:
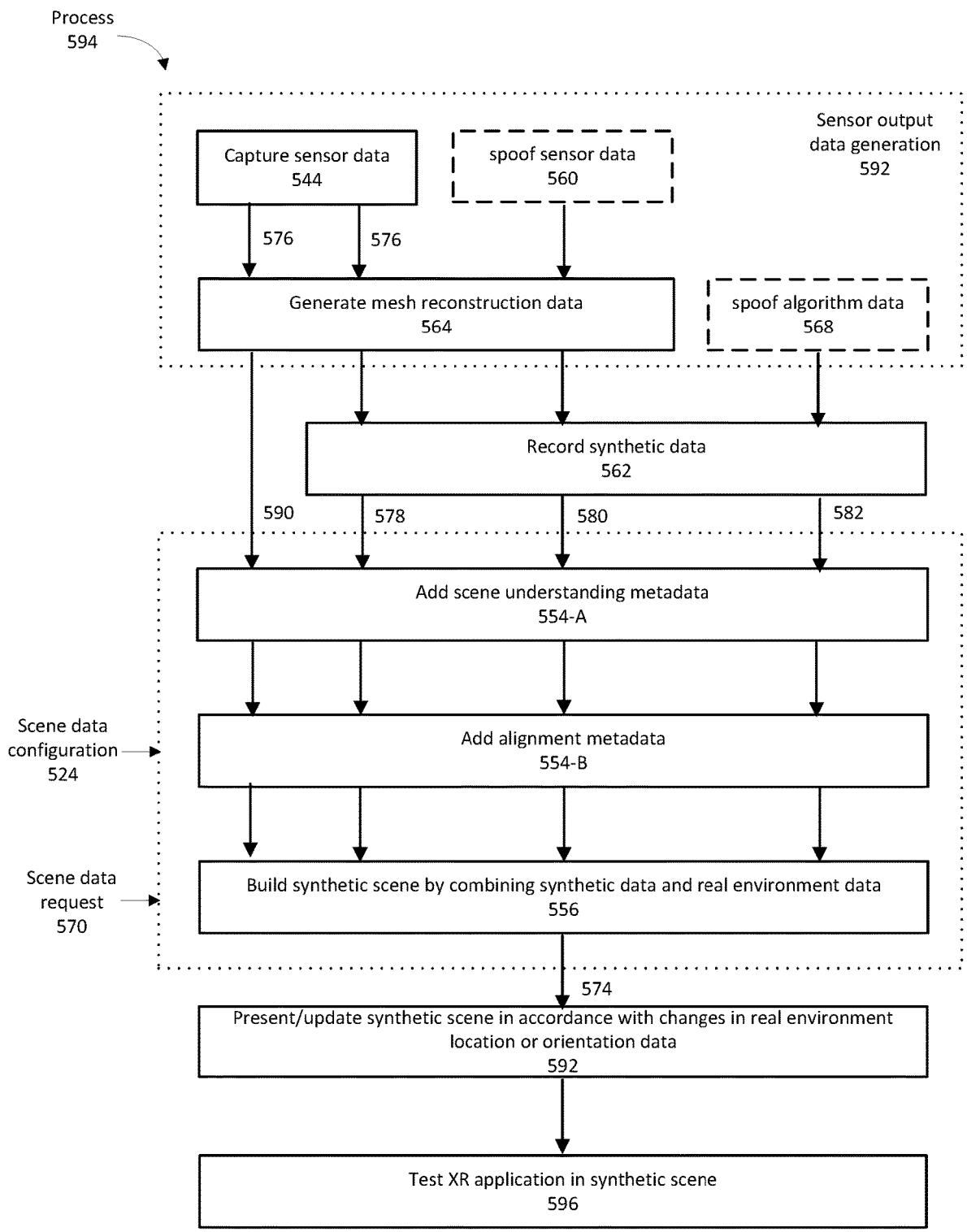
FIG. 5 illustrates a process for generating synthetic scenes in accordance with some examples of the disclosure.

FIG. 5 illustrates a process 594 for generating synthetic scenes in accordance with some examples of the disclosure. In some examples, process 594 can be performed at an electronic device (e.g., device 100A, 100B or 300 in FIGS. 1A, 1B and 3A, respectively) in communication with a display and one or more input devices (e.g., sensors). In some examples, at 592, the process starts with sensor output data generation, which can include real and synthetic output data generation. In some examples, at 544, sensor output data 576 from actual sensors in the device can be captured, and in other examples, at 560, spoofed sensor data can be generated. In either instance, in some examples, at 564, the captured or spoofed sensor data (e.g., point cloud data) can be converted to mesh model geometries using mesh reconstruction algorithms. Additionally, in some examples, at 568, the algorithms that convert sensor data to mesh model geometries can be spoofed so that the mesh model geometries for synthetic sensor data can be generated without the need for real or spoofed sensor data, or the execution of mesh reconstruction algorithms. In some examples, at 562, synthetic real environment data 578 can be captured by recording the mesh model geometries of sensor data 544, synthetic authored environment data 580 can be captured by recording the mesh model geometries of spoofed sensor data 560, and synthetic authored scene understanding data 582 can be captured by recording the mesh model geometries of spoofed algorithm data 568.

In some examples, scene data configuration 524 can be provided by a developer (e.g., via a command line or other input mechanism) in process 594. Scene data configuration 524 can include attributes of a synthetic scene that a developer wants to use to test and debug a particular XR application, and can include a synthetic data configuration and a real environment data configuration. The synthetic data configuration can specify one or more types of synthetic data for the synthetic scene, such as synthetic real environment data, synthetic authored environment data, or synthetic authored scene understanding data. The real environment data configuration can specify one or more types of real environment data, such as real environment scene data, real environment location data, real environment orientation data, and real environment anchoring data derived from sensors. Different combinations of the above-described synthetic data and real environment data can be specified using scene data configuration 524 to create the desired synthetic scene for testing and debugging XR applications.

In some examples, scene understanding metadata can be added to the recorded synthetic data at 554-A, and alignment data can be added at 554-B. Scene understanding metadata and alignment metadata can be added to the mesh model geometries of sensor data 576 intended for real-time presentation on a display at 554-A and 554-B, respectively.

Real environment data (representing the real environment) can be combined with synthetic data and accumulated to generate scene data 574 for presentation as a synthetic scene on a display at 556. In some examples, scene data request 570 from a client application can cause scene data 574 to transmitted to the client application for rendering of the synthetic scene. The rendered synthetic scene can then be presented on a display and updated in accordance with changes to the location or orientation of the device at 592. XR applications can then be tested in the presented synthetic scene at 596.

It is understood that process 594 is an example and that more, fewer, or different operations can be performed in the same or in a different order. Additionally, the operations in process 594 described above are, optionally, implemented by running one or more functional modules in an information processing apparatus such as general-purpose processors (e.g., as described with respect to FIGS. 1A and 1B) or application specific chips, and/or by other components of FIGS. 1A and 1B.

Therefore, according to the above, some examples of the disclosure are directed to a method comprising, at an electronic device in communication with a display and one or more sensors, receiving, at a scene data processing service within a synthetic service, a scene data configuration, the scene data configuration including a synthetic data configuration and a real environment data configuration, the real environment data configuration specifying a type of real environment data derived from the one or more sensors, and a scene data request from a client application, in response to receiving the scene data request, and in accordance with the scene data configuration, combining synthetic data and real environment data within the scene data processing service to generate scene data, presenting a synthetic scene on the display, the synthetic scene based on the scene data, and operating the client application within the presented synthetic scene. Additionally or alternatively to one or more of the examples disclosed above, in some examples, the method further comprises combining the synthetic data and the real environment data to generate the scene data by combining at least a first subset of the synthetic data with the real environment data. Additionally or alternatively to one or more of the examples disclosed above, in some examples, the first subset of the synthetic data including synthetic anchoring data, and the real environment data including real environment anchoring data, the method further comprising anchoring the first subset of the synthetic data to the real environment data by aligning the synthetic anchoring data and the real environment anchoring data. Additionally or alternatively to one or more of the examples disclosed above, in some examples, the method further comprises converting the first subset of the synthetic data to mesh model geometries to enable the client application to access and interact with the first subset of the synthetic data as though it were real environment data. Additionally or alternatively to one or more of the examples disclosed above, in some examples the real environment data comprises at least one of real environment location data and real environment orientation data, the method further comprising detecting a change in at least one of the real environment location data and the real environment orientation data, in accordance with the detected change, updating the scene data to reflect the detected change in at least one of the real environment location data and the real environment orientation data, and updating the synthetic scene presented on the display in accordance with the updated scene data. Additionally or alternatively to one or more of the examples disclosed above, in some examples, the method further comprises combining the synthetic data and the real environment data to generate the scene data by replacing a first subset of the real environment data with a first subset of the synthetic data. Additionally or alternatively to one or more of the examples disclosed above, in some examples both the first subset of the real environment data and the first subset of the synthetic data have a same object type. Additionally or alternatively to one or more of the examples disclosed above, in some examples the synthetic data includes synthetic anchoring data, and the real environment data includes real environment anchoring data, the method further comprising anchoring the first subset of the synthetic data to the real environment data by aligning the synthetic anchoring data and the real environment anchoring data. Additionally or alternatively to one or more of the examples disclosed above, in some examples, the method further comprises converting the first subset of the synthetic data to mesh model geometries to enable the client application to access and interact with the first subset of the synthetic data as though it were real environment data. Additionally or alternatively to one or more of the examples disclosed above, in some examples the real environment data comprises at least one of real environment location data and real environment orientation data, the method further comprising detecting a change in at least one of the real environment location data and the real environment orientation data, in accordance with the detected change, updating the scene data to reflect the detected change in at least one of the real environment location data and the real environment orientation data, and updating the synthetic scene presented on the display in accordance with the updated scene data. Additionally or alternatively to one or more of the examples disclosed above, in some examples the real environment data comprises at least one of real environment location data, real environment orientation data, and real environment anchoring data, the method further comprising replacing, except for at least one of the real environment location data, the real environment orientation data, and the real environment anchoring data, the real environment data with the synthetic data. Additionally or alternatively to one or more of the examples disclosed above, in some examples the synthetic data including synthetic anchoring data and the real environment data including real environment anchoring data, the method further comprising anchoring the synthetic data to the real environment data by aligning the synthetic anchoring data and the real environment anchoring data. Additionally or alternatively to one or more of the examples disclosed above, in some examples, the method further comprises converting the synthetic data to mesh model geometries to enable the client application to access and interact with the synthetic data as though it were real environment data. Additionally or alternatively to one or more of the examples disclosed above, in some examples, the method further comprises detecting a change in at least one of the real environment location data and the real environment orientation data, in accordance with the detected change, updating the synthetic data to reflect the detected change in at least one of the real environment location data and the real environment orientation data, and updating the synthetic scene presented on the display in accordance with the updated synthetic data. Additionally or alternatively to one or more of the examples disclosed above, in some examples the real environment data and the synthetic data represent different physical locations. Additionally or alternatively to one or more of the examples disclosed above, in some examples the real environment data and the synthetic data represent the same physical location. Additionally or alternatively to one or more of the examples disclosed above, in some examples, the method further comprises receiving, at the scene data processing service, sensor output data from the one or more sensors, and generating, at the scene data processing service, the real environment data from the sensor output data. Additionally or alternatively to one or more of the examples disclosed above, in some examples, the method further comprises, at a synthetic scene authoring service within the scene data processing service, converting the real environment data to post-algorithm real environment data including at least one of mesh reconstruction data and scene understanding metadata. Additionally or alternatively to one or more of the examples disclosed above, in some examples the sensor output data comprises at least one of camera data, depth data, location data, gaze data, orientation data, and accelerometer data. Additionally or alternatively to one or more of the examples disclosed above, in some examples the real environment data comprises one or more of a plurality of real environment data types, including real environment scene data, real environment location data, real environment orientation data, and real environment anchoring data. Additionally or alternatively to one or more of the examples disclosed above, in some examples, the method further comprises, in accordance with a determination that the real environment data configuration specifies one or more real environment data types, combining the synthetic data with the real environment data of the specified one or more real environment data types. Additionally or alternatively to one or more of the examples disclosed above, in some examples the synthetic data comprises at least one of a plurality of synthetic data types, including synthetic real environment data, synthetic authored environment data, and synthetic authored scene understanding data. Additionally or alternatively to one or more of the examples disclosed above, in some examples, the method further comprises, in accordance with a determination that the synthetic data configuration specifies one or more synthetic data types, combining the real environment data with the synthetic data of the specified one or more synthetic data types. Additionally or alternatively to one or more of the examples disclosed above, in some examples, the method further comprises, at a synthetic data generation service within the synthetic service, receiving sensor output data from the one or more sensors, and capturing and accumulating, at a sensor data recording service within the synthetic data generation service, synthetic real environment data derived from the sensor output data. Additionally or alternatively to one or more of the examples disclosed above, in some examples, the method further comprises, at a synthetic scene authoring service within the scene data processing service, converting the synthetic real environment data to post-algorithm synthetic real environment data including mesh reconstruction data. Additionally or alternatively to one or more of the examples disclosed above, in some examples, the method further comprises, in accordance with a determination that the synthetic data configuration specifies synthetic real environment data, combining the real environment data with the post-algorithm synthetic real environment data. Additionally or alternatively to one or more of the examples disclosed above, in some examples the post-algorithm synthetic real environment data comprises scene understanding metadata including at least one of geometry identification metadata, classification metadata, object metadata, and material metadata. Additionally or alternatively to one or more of the examples disclosed above, in some examples, the method further comprises, at a synthetic data generation service within the synthetic service, generating, at a sensor spoofing service within the synthetic data generation service, synthetic sensor output data, the synthetic sensor output data including at least one of synthetic camera data, synthetic depth data, synthetic location data, synthetic gaze data, synthetic orientation data, and synthetic accelerometer data, and in response to the generation of the synthetic sensor output data, generating, at a spoofed sensor data formatting service within the synthetic data generation service, synthetic authored environment data from the synthetic sensor output data. Additionally or alternatively to one or more of the examples disclosed above, in some examples, the method further comprises, at a synthetic scene authoring service within the scene data processing service, converting the synthetic authored environment data to post-algorithm synthetic authored environment data including mesh reconstruction data. Additionally or alternatively to one or more of the examples disclosed above, in some examples, the method further comprises, in accordance with a determination that the synthetic data configuration specifies synthetic authored environment data, combining the real environment data with the post-algorithm synthetic authored environment data. Additionally or alternatively to one or more of the examples disclosed above, in some examples the post-algorithm synthetic authored environment data comprises scene understanding metadata including at least one of geometry identification metadata, classification metadata, object metadata, and material metadata. Additionally or alternatively to one or more of the examples disclosed above, in some examples, the method further comprises, at a synthetic data generation service within the synthetic service, generating, at an algorithm spoofing service within the synthetic data generation service, synthetic authored scene understanding data. Additionally or alternatively to one or more of the examples disclosed above, in some examples, the method further comprises, at the synthetic scene authoring service within the scene data processing service, converting the synthetic authored scene understanding data to post-algorithm synthetic authored scene understanding data including mesh reconstruction data. Additionally or alternatively to one or more of the examples disclosed above, in some examples, the method further comprises, in accordance with a determination that the synthetic data configuration specifies synthetic authored scene understanding data, combining the real environment data with the post-algorithm synthetic authored scene understanding data. Additionally or alternatively to one or more of the examples disclosed above, in some examples the post-algorithm synthetic authored scene understanding data comprises scene understanding metadata including at least one of geometry identification metadata, classification metadata, object metadata, and material metadata.

Some examples of the disclosure are directed to an electronic device comprising one or more processors, memory, and one or more programs stored in the memory and configured to be executed by the one or more processors, the one or more programs including instructions for performing any of the methods disclosed above.

Some examples of the disclosure are directed to a non-transitory computer readable storage medium storing one or more programs, the one or more programs comprising instructions, which when executed by one or more processors of an electronic device, cause the electronic device to perform any of the methods disclosed above.

Some examples of the disclosure are directed to an electronic device comprising one or more processors, memory, and means for performing any of the methods disclosed above.

Some examples of the disclosure are directed to an information processing apparatus for use in an electronic device, the information processing apparatus comprising means for performing any of the methods disclosed above.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:
1. A method, comprising:
at an electronic device in communication with a display and one or more sensors,
receiving, at a scene data processing service within a synthetic service,
a scene data configuration, the scene data configuration including a synthetic data configuration and a real environment data configuration, the real environment data configuration specifying a real environment data type derived from the one or more sensors, and
a scene data request from a client application,
in response to receiving the scene data request, and in accordance with the scene data configuration, combining synthetic data and real environment data within the scene data processing service to generate scene data,
presenting a synthetic scene on the display, the synthetic scene based on the scene data, and operating the client application within the presented synthetic scene.

2. The method of claim 1, further comprising combining the synthetic data and the real environment data to generate the scene data by combining at least a first subset of the synthetic data with the real environment data.

3. The method of claim 2, the first subset of the synthetic data including synthetic anchoring data, and the real environment data including real environment anchoring data, the method further comprising:
anchoring the first subset of the synthetic data to the real environment data by aligning the synthetic anchoring data and the real environment anchoring data.

4. The method of claim 2, further comprising converting the first subset of the synthetic data to mesh model geometries to enable the client application to access and interact with the first subset of the synthetic data as though it were real environment data.

5. The method of claim 2, wherein the real environment data comprises at least one of real environment location data and real environment orientation data, the method further comprising:
detecting a change in at least one of the real environment location data and the real environment orientation data;
in accordance with the detected change, updating the scene data to reflect the detected change in at least one of the real environment location data and the real environment orientation data; and
updating the synthetic scene presented on the display in accordance with the updated scene data.

6. The method of claim 1, further comprising combining the synthetic data and the real environment data to generate the scene data by replacing a first subset of the real environment data with a first subset of the synthetic data.

7. The method of claim 6, wherein the synthetic data includes synthetic anchoring data, and the real environment data includes real environment anchoring data, the method further comprising:
anchoring the first subset of the synthetic data to the real environment data by aligning the synthetic anchoring data and the real environment anchoring data.

8. The method of claim 6, further comprising converting the first subset of the synthetic data to mesh model geometries to enable the client application to access and interact with the first subset of the synthetic data as though it were real environment data.

9. The method of claim 6, wherein the real environment data comprises at least one of real environment location data and real environment orientation data, the method further comprising:
detecting a change in at least one of the real environment location data and the real environment orientation data;
in accordance with the detected change, updating the scene data to reflect the detected change in at least one of the real environment location data and the real environment orientation data; and
updating the synthetic scene presented on the display in accordance with the updated scene data.

10. The method of claim 1, wherein the real environment data comprises at least one of real environment location data, real environment orientation data, and real environment anchoring data, the method further comprising:
replacing, except for at least one of the real environment location data, the real environment orientation data, and the real environment anchoring data, the real environment data with the synthetic data.

11. The method of claim 10, the synthetic data including synthetic anchoring data and the real environment data including real environment anchoring data, the method further comprising:
anchoring the synthetic data to the real environment data by aligning the synthetic anchoring data and the real environment anchoring data.

12. The method of claim 10, further comprising converting the synthetic data to mesh model geometries to enable the client application to access and interact with the synthetic data as though it were real environment data.

13. The method of claim 10, further comprising:
detecting a change in at least one of the real environment location data and the real environment orientation data;
in accordance with the detected change, updating the synthetic data to reflect the detected change in at least one of the real environment location data and the real environment orientation data; and
updating the synthetic scene presented on the display in accordance with the updated synthetic data.

14. The method of claim 1, further comprising:
receiving, at the scene data processing service, sensor output data from the one or more sensors; and
generating, at the scene data processing service, the real environment data from the sensor output data.

15. The method of claim 14, further comprising:
at a synthetic scene authoring service within the scene data processing service, converting the real environment data to post-algorithm real environment data including at least one of mesh reconstruction data and scene understanding metadata.

16. The method of claim 14, wherein the sensor output data comprises at least one of camera data, depth data, location data, gaze data, orientation data, and accelerometer data.

17. The method of claim 14, wherein the real environment data comprises one or more of a plurality of real environment data types, including real environment scene data, real environment location data, real environment orientation data, and real environment anchoring data.

18. The method of claim 14, further comprising:
in accordance with a determination that the real environment data configuration specifies one or more real environment data types, combining the synthetic data with the real environment data of the specified one or more real environment data types.

19. The method of claim 1, wherein the synthetic data comprises at least one of a plurality of synthetic data types, including synthetic real environment data, synthetic authored environment data, and synthetic authored scene understanding data.

20. The method of claim 19, further comprising:
in accordance with a determination that the synthetic data configuration specifies one or more synthetic data types, combining the real environment data with the synthetic data of the specified one or more synthetic data types.

21. The method of claim 19, further comprising:
at a synthetic data generation service within the synthetic service,
receiving sensor output data from the one or more sensors, and
capturing and accumulating, at a sensor data recording service within the synthetic data generation service, synthetic real environment data derived from the sensor output data.

22. The method of claim 19, further comprising:
at a synthetic scene authoring service within the scene data processing service, converting the synthetic real environment data to post-algorithm synthetic real environment data including mesh reconstruction data.

23. The method of claim 22, further comprising:
in accordance with a determination that the synthetic data configuration specifies synthetic real environment data, combining the real environment data with the post-algorithm synthetic real environment data.

24. An electronic device comprising:
memory; and
one or more processors communicatively coupled to the memory and programmed to
  receive, at a scene data processing service within a synthetic service,
    a scene data configuration, the scene data configuration including a synthetic data configuration and a real environment data configuration, the real environment data configuration specifying a real environment data type derived from one or more sensors, and
    a scene data request from a client application,
  in response to receiving the scene data request, and in accordance with the scene data configuration, combine synthetic data and real environment data within the scene data processing service to generate scene data,
  present a synthetic scene on a display, the synthetic scene based on the scene data, and
  operate the client application within the presented synthetic scene.

25. A non-transitory computer readable storage medium storing one or more programs, the one or more programs comprising instructions, which when executed by one or more processors of an electronic device, cause the electronic device to perform a method comprising:
receiving, at a scene data processing service within a synthetic service,
  a scene data configuration, the scene data configuration including a synthetic data configuration and a real environment data configuration, the real environment data configuration specifying a real environment data type derived from one or more sensors, and
  a scene data request from a client application;
in response to receiving the scene data request, and in accordance with the scene data configuration, combining synthetic data and real environment data within the scene data processing service to generate scene data;
presenting a synthetic scene on a display, the synthetic scene based on the scene data; and
operating the client application within the presented synthetic scene.

* * * * *